(12) United States Patent
Ollila et al.

(10) Patent No.: US 11,029,408 B2
(45) Date of Patent: Jun. 8, 2021

(54) DISTANCE-IMAGING SYSTEM AND METHOD OF DISTANCE IMAGING

(71) Applicant: Varjo Technologies Oy, Helsinki (FI)

(72) Inventors: Mikko Ollila, Tampere (FI); Oiva Arvo Oskari Sahlsten, Salo (FI)

(73) Assignee: Varjo Technologies Oy, Helsinki (FI)

( * ) Notice: Subject to any disclaimer, the term of this patent is extended or adjusted under 35 U.S.C. 154(b) by 162 days.

(21) Appl. No.: 16/373,902

(22) Filed: Apr. 3, 2019

(65) Prior Publication Data

US 2020/0319341 A1 Oct. 8, 2020

(51) Int. Cl.
*G01S 17/89* (2020.01)
*H04N 5/235* (2006.01)
*G06T 7/73* (2017.01)
*G06F 3/01* (2006.01)

(52) U.S. Cl.
CPC .............. *G01S 17/89* (2013.01); *G06F 3/013* (2013.01); *G06T 7/73* (2017.01); *H04N 5/2351* (2013.01)

(58) Field of Classification Search
CPC .......... G01S 17/89; G06F 3/013; G06T 7/73; H04N 5/2351
See application file for complete search history.

(56) References Cited

U.S. PATENT DOCUMENTS

| | | | |
|---|---|---|---|
| 9,063,283 B2* | 6/2015 | Shpunt | G01B 11/25 |
| 10,426,916 B2* | 10/2019 | Sakai | A61B 5/1104 |
| 2016/0061939 A1* | 3/2016 | Eno | G02B 26/128 |
| | | | 356/4.01 |
| 2016/0377414 A1* | 12/2016 | Thuries | G02B 27/1093 |
| | | | 356/625 |
| 2018/0203122 A1* | 7/2018 | Grauer | G01S 17/18 |
| 2019/0039507 A1* | 2/2019 | Higgins-Luthman | ........ |
| | | | B60Q 1/245 |
| 2019/0064705 A1* | 2/2019 | Yagi | G03G 9/00 |
| 2020/0132844 A1* | 4/2020 | Wolf | G01S 17/42 |
| 2020/0152105 A1* | 5/2020 | Ishii | G09G 5/00 |

* cited by examiner

*Primary Examiner* — Bobbak Safaipour
(74) *Attorney, Agent, or Firm* — Ziegler IP Law Group, LLC

(57) ABSTRACT

A distance-imaging system including an illuminating unit that projects a spatially non-uniform pattern of light spots onto objects present in real-world environment, first portion of said pattern having higher density of light spots than second portion of said pattern; at least one camera that captures image of reflections of the light spots from surfaces of the objects; and at least one optical element associated with said camera, wherein first optical portion of said optical element has higher magnification factor than second optical portion of said optical element, reflections of said first and second portions of spatially non-uniform pattern of light spots being differently magnified and/or de-magnified by said first and second optical portions, respectively.

20 Claims, 13 Drawing Sheets

DISTANCE-IMAGING SYSTEM AND METHOD OF DISTANCE IMAGING

TECHNICAL FIELD

The present disclosure relates generally to distance-imaging systems; and more specifically, to distance-imaging systems comprising illuminating units, cameras and optical elements. Furthermore, the present disclosure also relates to methods of distance imaging, via the aforementioned distance-imaging systems.

BACKGROUND

Nowadays, distance-imaging (namely, depth-imaging) is increasingly being employed for various purposes such as navigation, cross reality applications, military training, surveillance, and the like.

A conventional distance-imaging equipment employs an illumination source for illuminating a given environment, and an imaging unit for capturing image(s) of the given environment. Often, in such a case, the illumination source projects a pattern of light spots onto objects in the given environment and the captured image(s) depict(s) reflections of the light spots from surfaces of the objects. A distance of such objects from the distance-imaging equipment is calculated using the captured image(s).

Generally, imaging units used in such distance-imaging equipment employ optical components (such as lenses, mirrors, and the like) having uniform optical properties. Nowadays, specialized optical components having variable optical properties with respect to magnification and/or de-magnification are being developed for use in such imaging units. Notably, these specialized optical components capture warped images of the given environment by magnifying a first portion of the given environment to a greater degree than a second portion of the given environment. Beneficially, such warped images can be efficiently utilised with Fovea contingent displays, for imitating a physiology of human vision.

However, existing distance-imaging equipment are not well-developed to suitably work with such specialized optical components. As an example, in traditional distance-imaging equipment, a given illumination source may project an equally-spaced pattern of light spots towards the given environment, and reflections of such light spots may be captured as a warped image using imaging units having the aforesaid specialized optical components. In the warped image, reflections of light spots corresponding to the first portion of the given environment would be much more spaced apart as compared to reflections of light spots corresponding to the second portion of the given environment. Often, in the warped image, the reflections of light corresponding to the second portion of the given environment overlap with each other to an extent that they are indistinguishable from one another. As a result, when such a warped image is used for calculating distances between the objects in the given environment and the distance-imaging equipment, said calculation is cumbersome and error-prone.

Therefore, in light of the foregoing discussion, there exists a need to overcome the aforementioned drawbacks associated with conventional distance-imaging equipment.

SUMMARY

The present disclosure seeks to provide a distance-imaging system. The present disclosure also seeks to provide a method of distance imaging, via a distance-imaging system. The present disclosure seeks to provide a solution to the existing problem of incompatibility of existing distance-imaging systems with specialized optical components having variable optical properties, wherein such incompatibility leads to inaccuracies in distance measurement. An aim of the present disclosure is to provide a solution that overcomes at least partially the problems encountered in prior art, and provides a distance-imaging system that uses such specialized optical components to accurately and efficiently calculate distances of objects in a given environment.

In one aspect, an embodiment of the present disclosure provides a distance-imaging system comprising:
- an illuminating unit that, in operation, projects a spatially non-uniform pattern of light spots onto objects present in a real-world environment, wherein a first portion of said pattern has a higher density of light spots than a second portion of said pattern;
- at least one camera that, in operation, captures an image of reflections of the light spots from surfaces of the objects; and
- at least one optical element associated with the at least one camera, wherein a first optical portion of the at least one optical element has a higher magnification factor than a second optical portion of the at least one optical element, wherein reflections of said first and second portions of the spatially non-uniform pattern of light spots are differently magnified and/or de-magnified by said first and second optical portions of the at least one optical element, respectively.

In another aspect, an embodiment of the present disclosure provides a method of distance imaging, via a distance-imaging system comprising an illuminating unit, at least one camera and at least one optical element, the method comprising:
- projecting, via the illuminating unit, a spatially non-uniform pattern of light spots onto objects present in a real-world environment, wherein a first portion of said pattern has a higher density of light spots than a second portion of said pattern;
- capturing, via the at least one camera, an image of reflections of the light spots from surfaces of the objects; and
- differently magnifying and/or de-magnifying reflections of said first and second portions of the spatially non-uniform pattern of light spots using first and second optical portions of the at least one optical element, respectively, wherein the first optical portion of the at least one optical element has a higher magnification factor than the second optical portion of the at least one optical element.

Embodiments of the present disclosure substantially eliminate or at least partially address the aforementioned problems in the prior art, and provides a distance-imaging system that efficiently and accurately calculates distances of objects in a given environment.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 7A is an exemplary implementation of an illuminating unit in a real-world environment, while

FIG. 8A is an exemplary implementation of an illuminating unit in a real-world environment, while

Figure 1:
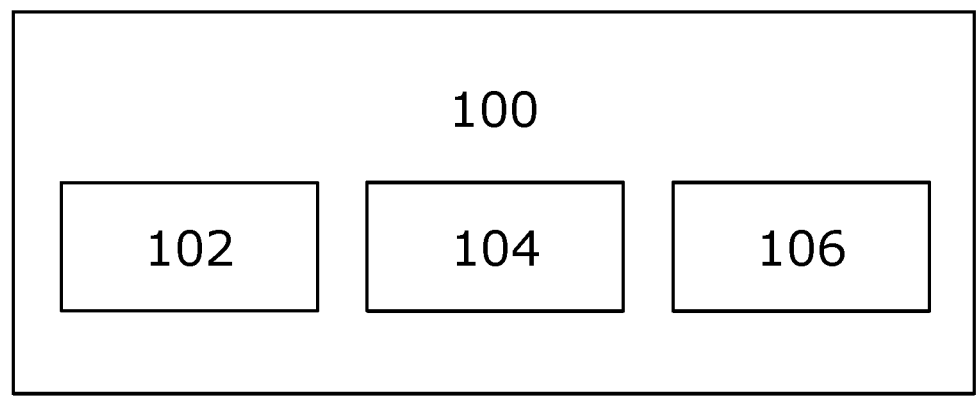
FIGS. 1, 2 and 3 illustrate block diagrams of architectures of a distance-imaging system, in accordance with various embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a distance-imaging system comprising:

an illuminating unit that, in operation, projects a spatially non-uniform pattern of light spots onto objects present in a real-world environment, wherein a first portion of said pattern has a higher density of light spots than a second portion of said pattern;

at least one camera that, in operation, captures an image of reflections of the light spots from surfaces of the objects; and at least one optical element associated with the at least one camera, wherein a first optical portion of the at least one optical element has a higher magnification factor than a second optical portion of the at least one optical element, wherein reflections of said first and second portions of the spatially non-uniform pattern of light spots are differently magnified and/or de-magnified by said first and second optical portions of the at least one optical element, respectively.

In another aspect, an embodiment of the present disclosure provides a method of distance imaging, via a distance-imaging system comprising an illuminating unit, at least one camera and at least one optical element, the method comprising:

projecting, via the illuminating unit, a spatially non-uniform pattern of light spots onto objects present in a real-world environment, wherein a first portion of said pattern has a higher density of light spots than a second portion of said pattern;

capturing, via the at least one camera, an image of reflections of the light spots from surfaces of the objects; and differently magnifying and/or de-magnifying reflections of said first and second portions of the spatially non-uniform pattern of light spots using first and second optical portions of the at least one optical element, respectively, wherein the first optical portion of the at least one optical element has a higher magnification factor than the second optical portion of the at least one optical element.

The present disclosure provides the aforementioned distance-imaging system and the aforementioned method of distance imaging. In the distance-imaging system, spatially variable characteristics of the illuminating unit are compatible with spatially variable optical characteristics of the at least one optical element. As a result, the image captured by the at least one camera depicts a substantially uniform distribution of the reflections of the light spots. In the captured image, reflections of different light spots are accurately distinguishable from one another due to adequate spacing therebetween. Using such an image for calculation of distances between the objects in the real-world environment and the distance-imaging system beneficially enhances an accuracy of said calculation.

Furthermore, the captured image is processed, for example, by comparison with a reference image of the spatially non-uniform pattern of light spots or by using triangulation technique, to calculate the distance between the objects in the real-world environment and the distance-imaging system. When multiple light spots are projected onto a given surface of an object, a shape of the given surface can be determined by calculating distances between the distance-imaging system and various points at which said light spots are incident. Moreover, the captured image can be used to determine an overall shape and size of three-dimensional objects in the real-world environment. Beneficially, depth information of the real-world environment and/or object geometry information can be utilized for various purposes such as three-dimensional environment mapping, gesture recognition, providing immersive cross reality applications in head-mounted devices, and the like.

Throughout the present disclosure, the term "distance-imaging system" refers to specialized equipment for producing images that are indicative of a distance between points in the image and the distance-imaging system. The images produced by the distance-imaging system are processed to yield the aforesaid distance.

Throughout the present disclosure, the term "illuminating unit" refers to equipment that, in operation, emits light to illuminate the real-world environment. Notably, the illuminating unit projects structured light (namely, light having a specific pattern) onto the objects present in the real-world environment. A manner in which such structured light deforms upon striking surfaces of the objects allows for calculating distance of the objects from the distance-imaging system.

Throughout the present disclosure, the phrase "spatially non-uniform pattern of light spots" refers to a pattern of light spots wherein a density of the light spots varies spatially across the pattern. Some examples of spatially non-uniform patterns of light spots have been illustrated in conjunction with FIGS. 4A and 4B, for the sake of clarity.

Optionally, a shape of the first portion of the spatially non-uniform pattern of light spots is circular, elliptical, polygonal, or a freeform shape. Moreover, optionally, a shape of a given light spot in the spatially non-uniform pattern of light spots is circular, elliptical, polygonal, or a freeform shape.

Optionally, in the spatially non-uniform pattern of light spots, the density of light spots varies along at least one of: a horizontal direction, a vertical direction. It will be appreciated that when the density of light spots varies along both the horizontal and vertical directions, the variation of said density along the horizontal direction may or may not be same as the variation of said density along the vertical direction.

Furthermore, optionally, in the spatially non-uniform pattern of light spots, the density of light spots in a given portion of said pattern varies as a function of an angular distance between the given portion and a centre of the first portion of said pattern. Optionally, in such a case, the density of light spots is the maximum at a central portion of said pattern.

Moreover, optionally, in the spatially non-uniform pattern of light spots, the density of light spots varies along a given direction according to a spatial distribution function. Optionally, in this regard, the density of light spots in said pattern decreases according to the spatial distribution function on going from its centre towards its edge. Examples of the spatial distribution function include, but are not limited to, a linear gradient function, a non-linear gradient function (for example, such as a Gaussian function, an exponential function, and the like), and a step gradient function.

As an example, in the spatially non-uniform pattern of light spots, the density of light spots may decrease non-linearly on going from a centre of said pattern towards a boundary of said pattern. Said non-linear variation of the density of light spots may, for example, be implemented according to a Gaussian function. In such a pattern, the density of light spots would vary spatially along both the horizontal direction and the vertical direction according to a same Gaussian function or different Gaussian functions.

Optionally, the first portion of the spatially non-uniform pattern of light spots corresponds to a central portion of said pattern, whereas the second portion of the spatially non-uniform pattern of light spots corresponds to a peripheral portion of said pattern, wherein the second portion surrounds the first portion. Optionally, in this regard, the centre of the first portion of the spatially non-uniform pattern of light spots coincides with the centre of the spatially non-uniform pattern of light spots.

Optionally, the density of light spots in the first portion of the spatially non-uniform pattern of light spots is greater than or equal to twice the density of light spots in the second portion of the spatially non-uniform pattern of light spots.

Optionally, an angular width of the first portion of the spatially non-uniform pattern with respect to the at least one camera lies in a range of 5 degrees to 60 degrees, and an angular width of the second portion of the spatially non-uniform pattern with respect to the at least one camera lies in a range of 40 degrees to 220 degrees. Throughout the present disclosure, the term "angular width" refers to an angular width of a given portion of the spatially non-uniform pattern of light spots as seen from an optical centre of the at least one optical element associated with the at least one camera. The term "angular width" also refers to a field of view (namely, an angular extent) associated with the given portion of the spatially non-uniform pattern of light spots. Notably, greater the angular width of the given portion, greater is the field of view covered by the given portion. It will be appreciated that the angular width of the second portion of said pattern is larger than the angular width of the first portion of said pattern. The angular width of the first portion of said pattern may, for example, be from 5, 10, 15, 20, 25, 30, 35, 40, 45, 50 or 55 degrees up to 10, 15, 20, 25, 30, 35, 40, 45, 50, 55 or 60 degrees. Likewise, the angular width of the second portion of said pattern may, for example, be from 40, 50, 60, 70, 80, 90, 100, 110, 120, 130, 140, 150, 160, 170, 180, 190, 200 or 210 degrees up to 50, 60, 70, 80, 90, 100, 110, 120, 130, 140, 150, 160, 170, 180, 190, 200, 210 or 220 degrees.

Throughout the present disclosure, the term "camera" refers to equipment that is operable to detect and process reflections of the light spots from surfaces of the objects present in the real-world environment, so as to capture the image of such reflections. It will be appreciated that said image of the reflections of the light spots may be captured from a perspective of the illuminating unit or from at least one different perspective.

Optionally, the at least one camera comprises a camera chip, wherein the reflections of the light spots are directed by the at least one optical element onto a photosensitive surface of the camera chip, thereby enabling the at least one camera to capture the image of said reflections.

It will be appreciated that the term "at least one camera" relates to "one camera" in some implementations, and "a plurality of cameras" in other implementations. More details of such implementations have been elucidated herein below.

Optionally, when the distance-imaging system employs one camera for capturing the image of the reflections of light spots, the captured image is compared with a reference image of the spatially non-uniform pattern of light spots to calculate the distance between points in the captured image and the distance-imaging system. In such a case, the captured image and the reference image are compared to determine a local transverse shift of light spots of said pattern, and such local transverse shift is used to calculate the aforesaid distance. Such a distance-imaging system in use within a given real-world environment has been illustrated in conjunction with FIG. 6A, for the sake of clarity.

Alternatively, optionally, when the distance-imaging system employs the plurality of cameras (namely, two or more cameras) for capturing a plurality of images of the reflections of light spots, the captured plurality of images are processed via triangulation technique to calculate the distance between points in the captured images and the distance-imaging system. Such a distance-imaging system in use within a given real-world environment has been illustrated in conjunction with FIG. 6B, for the sake of clarity.

Optionally, the at least one camera is at least one of: a digital camera, a RGB-D camera, a Light Detection and Ranging (LiDAR) camera, a Time-of-Flight (ToF) camera, a laser rangefinder, a stereo camera.

Moreover, optionally, the at least one camera is implemented as at least one of: an infrared camera, a visible-light camera, a hyperspectral camera.

Throughout the present disclosure, the term "at least one optical element" refers to a configuration of one or more optical components (for example, such as lenses, prisms, mirrors and so forth) that is capable of modifying projections passing therethrough or reflecting therefrom. Notably, the reflections of the light spots are directed by the at least one optical element towards the at least one camera.

The at least one optical element is arranged on an optical path of the reflections of light spots, between the objects present in the real-world environment and the at least one camera. Optionally, the at least one optical element is arranged in a manner that said reflections are directed onto the photosensitive surface of the camera chip of the at least one camera, thereby enabling the at least one camera to capture the image of the reflections of light spots from surfaces of the objects.

In an embodiment, the at least one optical element is integrated with the at least one camera. In another embodiment, the at least one optical element is separate from the at least one camera.

Optionally, the at least one optical element is implemented as a single lens or mirror having a complex shape. As an example, the at least one optical element is implemented as an aspheric lens or mirror. As another example, the at least one optical element is implemented is implemented as a freeform lens or mirror.

Alternatively, optionally, the at least one optical element is implemented as a configuration of multiple lenses and/or mirrors. Optionally, in this regard, the first optical portion and the second optical portion of the at least one optical element are implemented by separate optical components.

Optionally, the at least one optical element is implemented as any of: a fresnel lens, an LC lens, or a liquid lens.

The terms "first optical portion" and "second optical portion" refer to different portions of the at least one optical element having different magnification and/or de-magnification properties. The first and second optical portions are capable of differently magnifying and/or de-magnifying the reflections of different portions of the spatially non-uniform pattern of light spots.

The reflections of the first portion of the spatially non-uniform pattern of light spots would pass through or reflect from the first optical portion, while the reflections of the second portion of the spatially non-uniform pattern of light spots would pass through or reflect from the second optical portion. Notably, the reflections of said first and second portions of the spatially non-uniform pattern of light spots are differently magnified and/or de-magnified by the first and second optical portions, respectively.

Throughout the present disclosure, the phrase "differently magnified and/or de-magnified" has been used to mean any of the following:

(i) the reflections of the first portion of the spatially non-uniform pattern of light spots are magnified more than the reflections of the second portion of the spatially non-uniform pattern of light spots, (ii) the reflections of the first portion of said pattern are magnified, whereas the reflections of the second portion of said pattern are not magnified at all, (iii) the reflections of the first portion of said pattern are magnified, whereas the reflections of the second portion of said pattern are de-magnified, (iv) the reflections of the first portion of said pattern are not magnified at all, whereas the reflections of the second portion of said pattern are de-magnified, or (v) the reflections of the second portion of said pattern are de-magnified more than the reflections of the first portion of said pattern.

As a result of the aforesaid different magnification and/or de-magnification, a distribution of the reflections of the light spots across the captured image is more uniform (namely, more evenly spaced) than a distribution of the light spots in the spatially non-uniform pattern of the light spots. In such a distribution of the reflections of the light spots, there would exist considerably even and adequate separation between reflections of different light spots, thereby allowing the reflections of different light spots to be easily distinguishable from one another. This, in turn, would enhance an accuracy of the calculated distance of the objects from the distance-imaging system.

According to an embodiment, the at least one optical element is asymmetrical with respect to its optical axis. Optionally, in such a case, the first optical portion and the second optical portion are positioned asymmetrically with respect to the optical axis of the at least one optical element.

According to another embodiment, the at least one optical element is symmetrical with respect to its optical axis. Optionally, in such a case, the first optical portion surrounds the optical centre of the at least one optical element, while the second optical portion surrounds the first optical portion, and is surrounded by a periphery of the at least one optical element.

Moreover, a magnification factor of the first optical portion is greater than a magnification factor of the second optical portion. Throughout the present disclosure, the term "magnification factor" refers to an extent to which reflections of a given portion of the spatially non-uniform pattern of light spots appear enlarged when viewed through a given optical portion of the at least one optical element. The term "magnification factor" encompasses both magnification and de-magnification, wherein said de-magnification pertains to an extent to which reflections of a given portion of the spatially non-uniform pattern of light spots appear shrunk when viewed through a given optical portion of the at least one optical element.

Moreover, the different magnification and/or de-magnification properties of the different optical portions are dependent on their curvature and focal length. Notably, for a simple magnifying lens, its magnification factor is directly proportional to its curvature, and therefore, is inversely proportional to its focal length. In other words, if a given optical portion of the at least one optical element is highly curved (namely, has a small radius of curvature), the focal length of the given optical portion is small. Consequently, the magnification factor of the given optical portion would be high.

Optionally, the magnification factor of the aforementioned optical portions of the at least one optical element is to vary from an optical centre of the first optical portion towards an edge (namely, a periphery) of the at least one optical element according to a spatial transfer function. In such a case, the magnification factor of the first optical portion and the second optical portion do not change abruptly as discrete values, rather they change smoothly according to the spatial transfer function.

When the at least one optical element is symmetrical with respect to its optical axis, an optical centre of the first optical portion corresponds to the centre of the at least one optical element. Optionally, in such a case, the magnification factor of the at least one optical element is maximum at its centre, and decreases on going from its centre towards its edge according to the spatial transfer function.

The "spatial transfer function" defines how the magnification factor varies at different portions of the at least one optical element. More optionally, the spatial transfer function is a function of two variables, wherein the two variables correspond to horizontal and vertical coordinates with respect to the optical centre of the first optical portion. Optionally, in such a case, the magnification properties of the at least one optical element vary differently in the horizontal and vertical directions.

The spatial transfer function could be a linear gradient function, a non-linear gradient function or a step gradient function. In an example case where the spatial transfer function is a step gradient function, the magnification factor of the at least one optical element would decrease step wise on going from the optical centre of the first optical portion towards the edge of the at least one optical element.

Furthermore, optionally, the first optical portion and/or the second optical portion have a substantially spherical shape or a substantially ellipsoidal shape. Moreover, optionally, when the at least one optical element is symmetrical with respect to its optical axis, the first optical portion and the second optical portion are concentric to each other.

Optionally, spatially variable characteristics of the illuminating unit and the at least one optical element are substantially matched. This allows for capturing, in the image, evenly spaced reflections of the light spots, wherein reflections of different light spots are easily distinguishable from one another. This enhances an accuracy of distances calculated via the distance-imaging system.

In an embodiment, the illuminating unit comprises a plurality of light sources, each of the plurality of light sources, in operation, projecting a spatially uniform pattern of light spots onto the objects present in the real-world environment. The plurality of light sources can be understood to project a plurality of spatially uniform patterns of light spots onto said objects. Optionally, in such a case, at least two of said plurality of spatially uniform patterns would overlap to produce a region having a higher density of light spots as compared to a remaining region of the plurality of spatially uniform patterns. As a result, the plurality of spatially uniform patterns of light spots would collectively form the spatially non-uniform pattern of light spots, wherein the aforesaid region of overlap corresponds to the first portion of said spatially non-uniform pattern and the remaining region of the plurality of spatially uniform patterns corresponds to the second portion of said spatially non-uniform pattern.

As an example, the illuminating unit may comprise two light sources, wherein the two light sources project a same spatially uniform pattern of light spots onto the objects present in the real-world environment. In such an example, an angular width of said spatially uniform pattern of light spots may be 70 degrees. The two spatially uniform patterns of light spots may be projected in manner that said patterns partly overlap with each other along a horizontal direction. As a result, a resultant spatially non-uniform pattern of light spots formed by said two spatially uniform patterns would vary spatially along the horizontal direction. Said resultant spatially non-uniform pattern may have, for example, an overall angular width of 100 degrees. In said spatially non-uniform pattern, a 40 degrees wide first portion (corresponding to the aforesaid region of overlap) lies between a 60 degrees wide second portion.

Figure 7A:
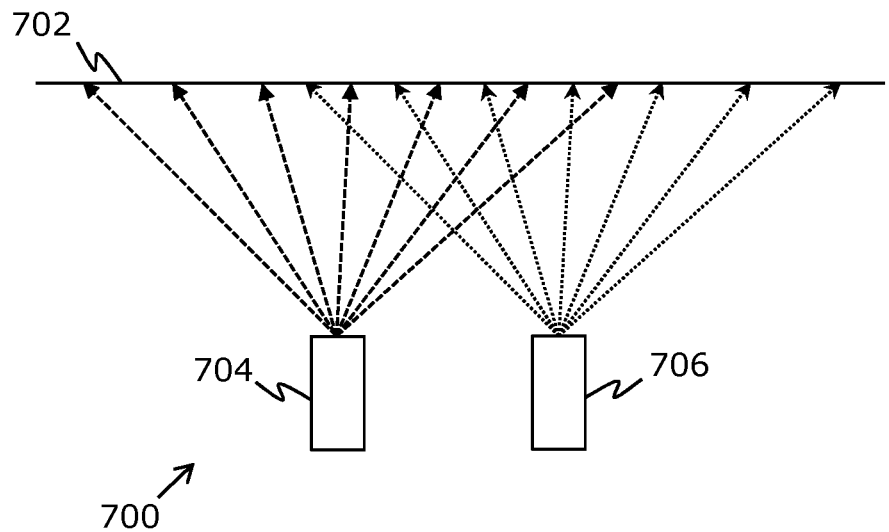
Figure 7B:
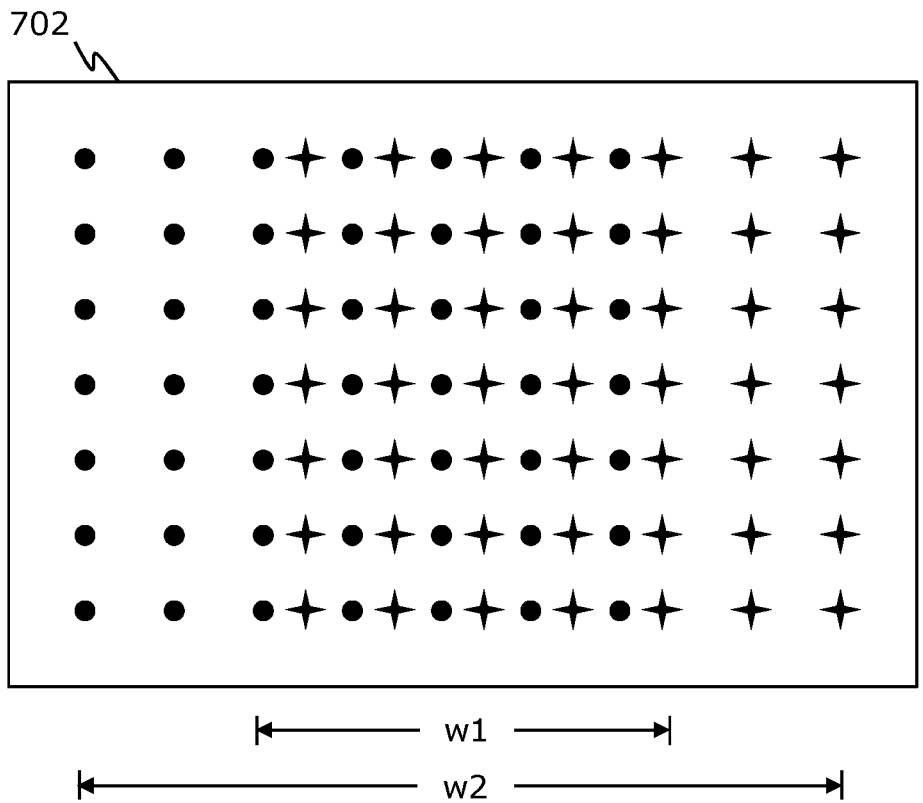
FIG. 7B is an illustration of a spatially non-uniform pattern of light spots as projected on an imaginary plane in the real-world environment, in accordance with an embodiment of the present disclosure.

The aforementioned example has been illustrated in conjunction with FIGS. 7A and 7B, for the sake of clarity.

It will be appreciated that the spatially non-uniform pattern of light spots that is formed via overlap of the plurality of spatially uniform patterns of light spots could be made to vary spatially along the horizontal direction and/or the vertical direction by adjusting an arrangement of the plurality of light sources in a required manner. As an example, the plurality of light sources may be arranged to project the plurality of spatially uniform patterns of light spots in a vertically overlapping manner.

Optionally, the plurality of light sources comprise at least a first light source and a second light source, a first pattern of light spots projected by the first light source is denser than a second pattern of light spots projected by the second light source, an angular width associated with the first pattern of light spots is narrower than an angular width associated with the second pattern of light spots. In such a case, the first and second patterns of light spots collectively produce the spatially non-uniform pattern of light spots.

Optionally, the first pattern of light spots and the second pattern of light spots overlap to produce the spatially non-uniform pattern of light spots. In such a case, a given portion of the second pattern of light spots overlaps with the first pattern of light spots to form the first portion of the spatially non-uniform pattern, whereas a remaining portion of the second pattern of light spots forms the second portion of the spatially non-uniform pattern.

As an example, the first pattern of light spots may have a density of X spots per 3*3 pixels of the camera chip of the at least one camera, whereas the second pattern of light spots may have a density of Y spots per 3*3 pixels of the camera chip of the at least one camera, wherein X is equal to twice of Y. Furthermore, horizontal and vertical angular widths of said first pattern may be 50 degrees and 40 degrees respectively. Likewise, horizontal and vertical angular widths of said second pattern may be 110 degrees and 70 degrees respectively. In such an example, the first and second patterns may collectively produce the spatially non-uniform pattern of light spots in a manner that the first pattern overlaps with a central portion of the second pattern. As a result, the first pattern and the central portion of the second pattern collectively form the first portion of the spatially non-uniform pattern of light spots, whereas a peripheral portion of the second pattern forms the second portion of the spatially non-uniform pattern of light spots.

Figure 8A:
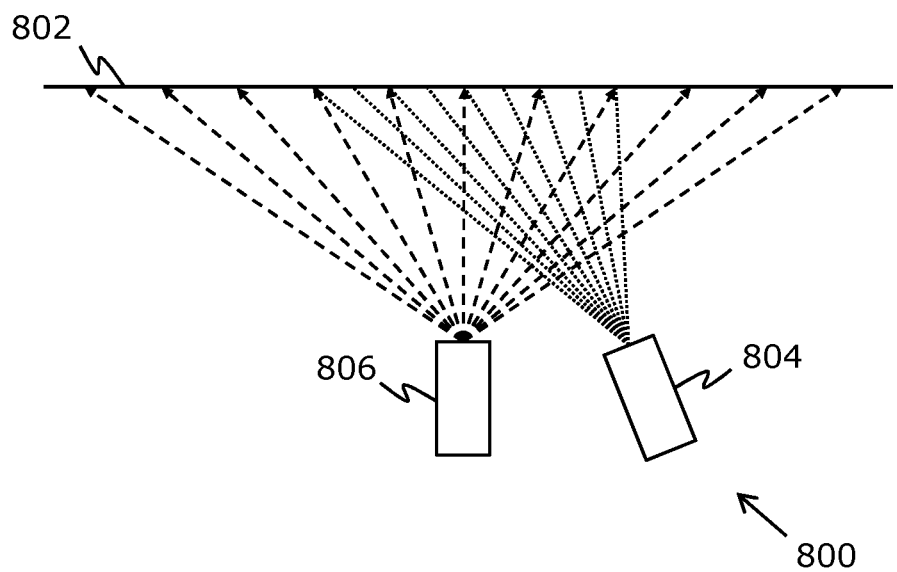
Figure 8B:
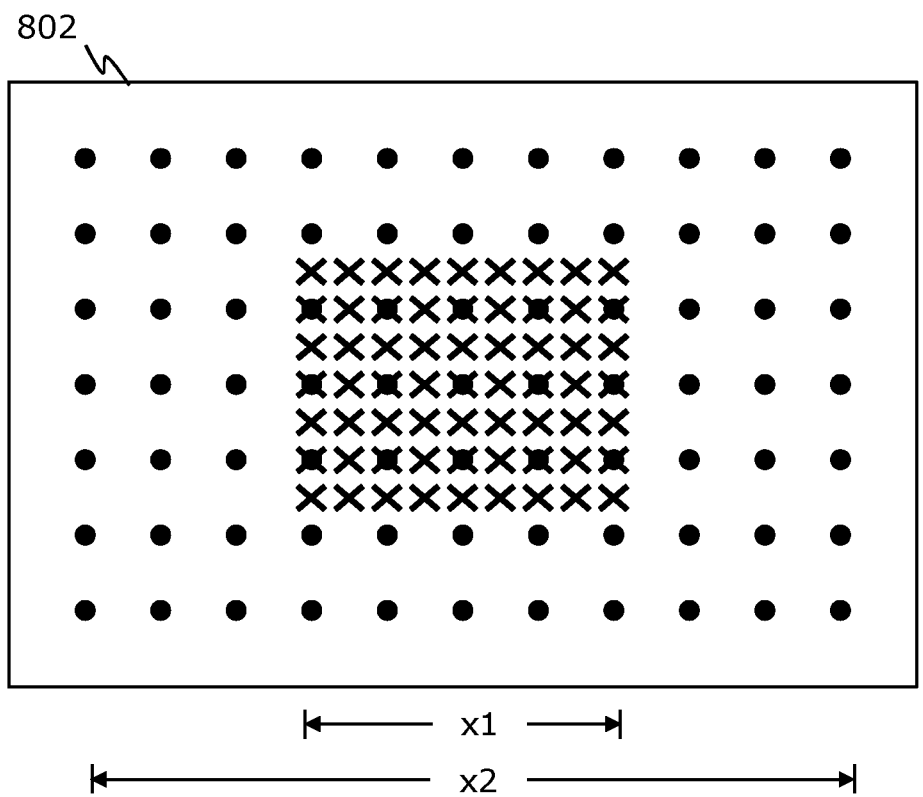
FIG. 8B is an illustration of a spatially non-uniform pattern of light spots as projected on an imaginary plane in the real-world environment, in accordance with another embodiment of the present disclosure.

The aforementioned example has been illustrated in conjunction with FIGS. 8A and 8B, for the sake of clarity.

It will be appreciated that the plurality of light sources are not limited to only the first light source and the second light source, and could include more than two light sources. For example, the plurality of light sources may comprise a third light source wherein a third pattern of light spots projected by the third light source has higher density than the second pattern of light spots, but lower density than the first pattern of light spots. In such an example, the third pattern of light spots would be utilised to provide (in the overlapping manner described hereinabove) a third portion of the spatially non-uniform pattern of light spots having a higher density of light spots than the second portion of said spatially non-uniform pattern, but a lower density of light spots than the first portion of said spatially non-uniform pattern. Such a third portion of the spatially non-uniform pattern of light spots would lie between the first and second portions of said spatially non-uniform pattern.

Optionally, the distance-imaging system further comprises
- at least one first actuator associated with at least one of the plurality of light sources; and
- a processor configured to receive information indicative of a gaze direction of a user, and to control the at least one first actuator to adjust an orientation of the at least one of the plurality of light sources according to the gaze direction of the user.

Optionally, in this regard, the processor is configured to determine, based on the gaze direction of the user, a region of interest in the real-world environment. Accordingly, the at least one of the plurality of light sources is oriented to direct at least one spatially uniform pattern of light spots projected therefrom towards the region of interest. At the region of interest, such at least one spatially uniform pattern of light spots is would then overlap with other spatially uniform pattern(s) of light spots projected by remaining light source(s) of the plurality of light sources to form the first portion of the spatially non-uniform pattern of light spots.

Herein, the term "region of interest" refers to a region of the real-world environment whereat the user's gaze may be focused at a given point of time.

It will be appreciated that with change in the gaze direction of the user, the region of interest in the real-world environment would change, and so would the orientation of the at least one of the plurality of light sources. Beneficially, such adjustment of the orientation of the at least one of the plurality of light sources allows for projecting a gaze-contingent spatially non-uniform pattern of light spots onto the objects in the real-world environment. In said gaze-contingent pattern, a location of the first portion of the spatially non-uniform pattern of light spots within said pattern is adjusted according to the gaze direction of the user. In particular, the location of the first portion of said pattern within an entirety of said pattern follows a relative location of the user's gaze within the real-world environment. As a result, a higher density of light spots is projected onto a region of the real-world environment towards with the user's gaze is directed. This beneficially allows for capturing more depth detail pertaining to said region of the real-world environment towards with the user's gaze is directed.

Throughout the present disclosure, the term "actuator" refers to equipment (for example, such as electrical components, mechanical components, magnetic components, polymeric components, and so forth) that is employed to move its associated component. The at least one actuator is controlled to move its associated component by at least one of: displacement of said component, rotation of said component, tilting of said component. Notably, the at least one actuator is driven by an actuation signal. It will be appreciated that the actuation signal could be a mechanical torque, an electric current, a hydraulic pressure, a pneumatic pressure, and the like.

The processor could be implemented as hardware, software, firmware or a combination of these. The processor is coupled to various components of the distance-imaging system, and is configured to control the operation of the distance-imaging system.

In an embodiment, the processor is configured to calculate the distance between points in the captured image and the distance-imaging system. In this regard, the processor optionally calculate the distances between the points in the captured image and the at least one camera. In another embodiment, a remote processor is configured to calculate the distance between points in the captured image and the distance-imaging system, said remote processor being communicably coupled to the distance-imaging system.

Optionally, the processor receives information indicative of the gaze direction of the user from a gaze-tracking unit. Herein, the term "gaze-tracking unit" refers to specialized equipment for detecting and/or following a direction of gaze of the user, when the user views the real-world environment. The gaze tracking unit could be mounted on a head-mounted device worn by the user, or be arranged within the real-world environment. Optionally, the gaze-tracking unit is implemented as contact lenses with sensors, cameras monitoring the position of the pupil of the user's eye, and the like. Beneficially, the gaze-tracking unit is arranged in a manner that said means do not cause any obstruction in an optical path of a projection of the real-world environment. Such a gaze-tracking unit can be understood to be a "means for detecting the gaze direction" of the user.

As an example, there may be two first actuators FA1 and FA2 associated with two light sources L1 and L2, respectively, among a plurality of light sources L1, L2, L3 and L4. Notably, the two first actuators FA1 and FA2 are controlled to adjust an orientation of their corresponding light sources L1 and L2, respectively, according to the gaze direction of the user. In an example scenario when the gaze direction of the user is directed towards a top right portion of the real-world environment, the first actuator FA1 arranged towards a left side of the real-world environment may tilt its corresponding light source L1 rightwards and upwards, whereas the second actuator FA2 arranged towards a right side of the real-world environment may tilt its corresponding light source L2 upwards. As a result, both the light sources L1 and L2 would be oriented to project their corresponding spatially uniform patterns of light spots onto the region of interest.

More optionally, the distance-imaging system further comprises at least one second actuator associated with the at least one optical element, wherein the processor is configured to control the at least one second actuator to adjust a rotational orientation of the at least one optical element according to the gaze direction of the user. When the spatially non-uniform pattern of light spots is formed according to the gaze direction of the user, said rotation of the at least one optical element is performed to align the at least one optical element in a manner that the reflections of the first portion of the said pattern would pass through or reflect from the first optical portion, while the reflections of the second portion of said pattern would pass through or reflect from the second optical portion.

Optionally, the at least one second actuator is capable of rotating the at least one optical element smoothly. Alternatively, optionally, the at least one second actuator has multiple discrete positions, according to which the relative position of the at least one optical element is adjusted with respect to the at least one camera.

Optionally, the at least one optical element is rotatable in one direction only, namely either clockwise or anti-clockwise. Alternatively, optionally, the at least one optical element is rotatable in both directions.

It will be appreciated that when the at least one optical element is symmetrical about its optical axis and the first optical portion is substantially ellipsoidal in shape, it is beneficial to rotate the at least one optical element based upon the detected gaze direction. Optionally, in such a case, if the at least one optical element is rotatable in only one direction, an angle of rotation of the at least one optical element lies within a range of 0 degrees to 180 degrees; otherwise, if the at least one optical element is rotatable in both the directions, the angle of rotation of the at least one optical element lies within a range of 0 degrees to 90 degrees. One such example implementation has been illustrated in conjunction with FIG. 12, as described below.

In other implementations, when the at least one optical element is asymmetrical about its optical axis and the first optical portion is positioned asymmetrically with respect to the optical axis of the at least one optical element, it is beneficial to rotate the at least one optical element based upon the detected gaze direction. Optionally, in such a case, if the at least one optical element is rotatable in only one direction, the angle of rotation of the at least one optical element lies within a range from 0 degrees to 360 degrees; otherwise, if the at least one optical element is rotatable in both the directions, the angle of rotation of the at least one optical element lies within a range of 0 degrees to 180 degrees. One such example implementation has been illustrated in conjunction with FIG. 13.

Additionally, optionally, the distance-imaging system further comprises at least one third actuator associated with the at least one camera, wherein the processor is configured to control the at least one third actuator to adjust an orientation of the at least one camera according to the gaze direction of the user. It will be appreciated that a change in the orientation of the at least one camera results in a change in a perspective from which the at least one camera views the real-world environment.

Optionally, the at least one second actuator and the at least one third actuator are controlled in a manner that a relative position of the at least one optical element with respect to the at least one camera is fixed. Alternatively, optionally, the at least one second actuator and the at least one third actuator are controlled in a manner that a relative position of the at least one optical element with respect to the at least one camera is adjustable.

Moreover, optionally, the processor is configured to receive information indicative of a head orientation of the user, and to control the at least one first actuator and/or the at least one third actuator according to the gaze direction and/or the head orientation of the user. It will be appreciated that when the user turns his/her head, the user's view of the real-world environment changes substantially. The at least one first actuator and/or the at least one third actuator is/are controlled to orient the at least one of the plurality of light sources and/or the at least one camera, respectively, in a manner that the spatially non-uniform pattern of light spots is produced according to the gaze direction and/or the head orientation of the user. This allows for capturing fine depth detail pertaining to the region of interest and/or a perspective of the user, even when the user changes his/her gaze direction and/or moves his/her head.

Optionally, the processor receives said information indicative of the head orientation of the user from a means for tracking a head orientation of the user, said means being mounted on a head-mounted device worn by the user. Herein, the term "means for tracking a head orientation" refers to specialized equipment for detecting and optionally, following the orientation of the user's head, when the head-mounted device is worn by the user. Optionally, the means for tracking the head orientation of the user is implemented using a gyroscope and an accelerometer.

In another embodiment, the illuminating unit comprises:
- at least one coherent light source that, in operation, emits light pulses; and
- a diffractive optical element arranged on an optical path of the light pulses.

In such a case, the diffractive optical element causes diffraction of the light pulses at various angles. Optionally, in this regard, an angle of diffraction corresponding to a central portion of the diffractive optical element is lesser than an angle of diffraction corresponding to a peripheral portion of the diffractive optical element. This leads to a much higher concentration of light pulses in a region corresponding to a geometrical shadow of the central portion of the diffractive optical element as compared to a concentration of light pulses in a region corresponding to a geometrical shadow of the peripheral portion of the diffractive optical element. As a result, there is produced a diffraction pattern wherein a central portion of said diffraction pattern has a higher density of light pulses as compared to a peripheral portion of said diffraction pattern. Therefore, said diffraction pattern acts as the spatially non-uniform pattern of light spots wherein the first portion of the spatially non-uniform pattern corresponds to the central portion of the diffraction pattern and the second portion of the spatially non-uniform pattern corresponds to the peripheral portion of the diffraction pattern.

Optionally, the diffractive optical element complies with a mathematical-physical model, wherein according to said model, angles of diffraction associated with the diffractive optical element substantially match and follow magnification and/or de-magnification properties of the at least one optical element. In particular, the mathematical-physical model allows for designing the diffractive optical element in a manner that a density profile of light spots formed by the diffraction pattern corresponds to a magnification and/or de-magnification profile of the at least one optical element.

Optionally, the diffractive optical element is implemented as any of: transmissive and reflective surface relief phase gratings of various profiles and structures, two dimensional diffractive structures, volume brag gratings, a diffractive beam splitter, a diffractive beam shaper, a diffractive line generator, a diffractive diffuser. Optionally, in this regard, the various profiles and structures of the transmissive and reflective surface relief phase gratings are any of: triangular grooves, binary lamellar gratings, multi-level lamellar gratings.

Furthermore, optionally, the diffractive optical element is implemented as a sequence of diffractive sub-elements. Within said sequence, the diffractive sub-elements are arranged according to their optical properties. As an example, a first diffractive sub-element may split the light pulses and a second diffractive sub-element may define the angles of diffraction of the split light pulses, in order to project the diffraction pattern having the density profile of light spots corresponding to the magnification and/or demagnification profile of the at least one optical element.

Optionally, the at least one coherent light source is implemented as at least one of: an infrared laser, a visible light laser. Moreover, optionally, the at least one coherent light source is implemented by at least one of: a solid-state laser, a semiconductor laser. As an example, the at least one coherent light source may be implemented by an edge-emitting semiconductor laser.

Figure 9:
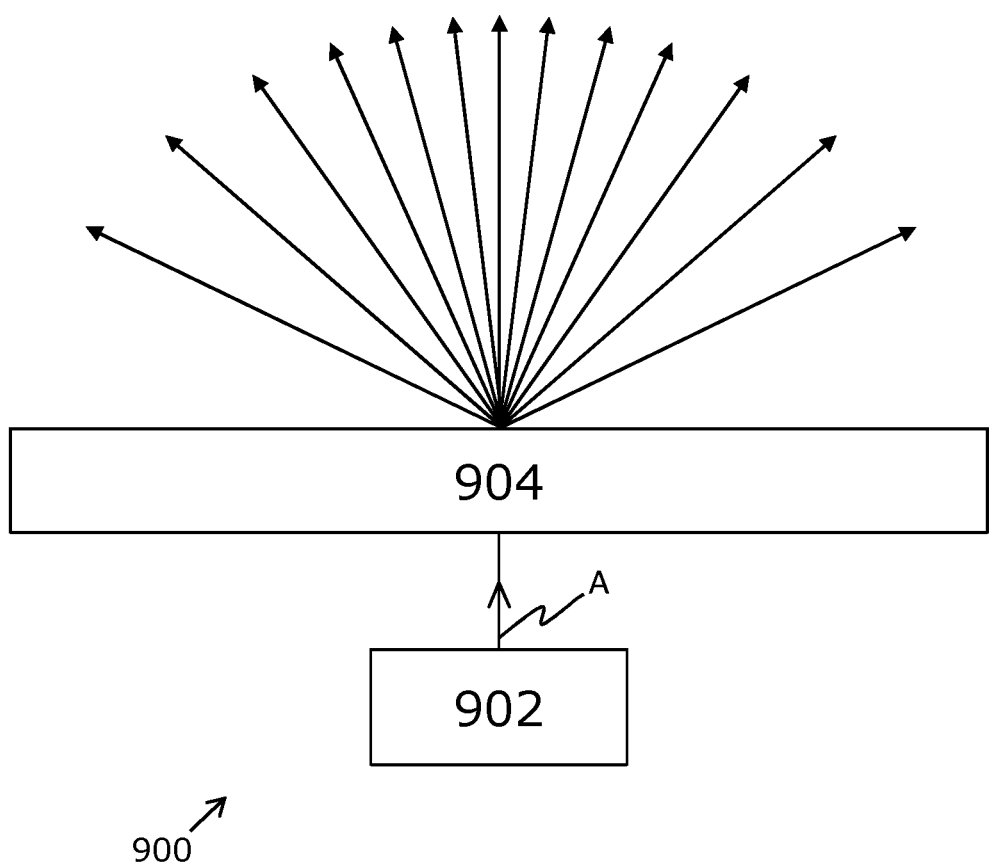
FIG. 9 is a schematic illustration of an illuminating unit, in accordance with an embodiment of the present disclosure.

One such illuminating unit comprising the at least one coherent light source and the diffractive optical element has been illustrated in conjunction with FIG. 9, for the sake of clarity.

In yet another embodiment, the illuminating unit comprises an array of optical emitters, wherein the optical emitters are arranged in a uniform two-dimensional pattern, and wherein the distance-imaging system further comprises a processor configured to receive information indicative of a gaze direction of a user, and to dynamically address the array of optical emitters according to the gaze direction of the user. Optionally, in this regard, the processor receives information indicative of the gaze direction of the user from the gaze-tracking unit. More optionally, the processor is configured to determine, based on the gaze direction of the user, the region of interest in the real-world environment.

Throughout the present disclosure, by the phrase "dynamically address the array of optical emitters", it is meant that optical emitters of the array are selectively switched on or switched off in a manner that light emitted by all optical emitters of the array that are switched on forms the spatially non-uniform pattern of light spots.

Optionally, the processor dynamically addresses the array of optical emitters in a manner that
- a set of optical emitters having a same relative position in the array as the region of interest in the real-world environment are switched on to form the first portion of the spatially non-uniform pattern of light spots, and
- remaining optical emitters of the array (namely, optical emitters of the array excluding optical emitters of the set) are selectively switched on or switched off to form the second portion of the spatially non-uniform pattern of light spots. In other words, all the optical emitters corresponding to the region of interest are switched on, whereas only some of the remaining optical emitters of the array are switched on to project a dynamic, gaze-contingent spatially non-uniform pattern of light spots onto the objects in the real-world environment.

As an example, the illuminating unit may comprise an 8*9 array of 72 optical emitters that are arranged in a uniform grid-like pattern. In such an example, the gaze direction of the user may be determined to lie in a central portion of the real-world environment. Accordingly, said array of optical emitters may be dynamically addressed according to the gaze direction of the user. Notably, in such a scenario, 16 optical emitters in a central portion of said array may be switched on to form the first portion of the spatially non-uniform pattern of light spots, whereas only 12 optical emitters among 56 optical emitters in a peripheral portion of said array may be switched on to form the second portion of the spatially non-uniform pattern of light spots. It will be appreciated that switching on only a few of the 56 optical emitters in the peripheral portion allows for providing a lower density of light spots in the second portion of said spatially non-uniform pattern.

Figure 10A:
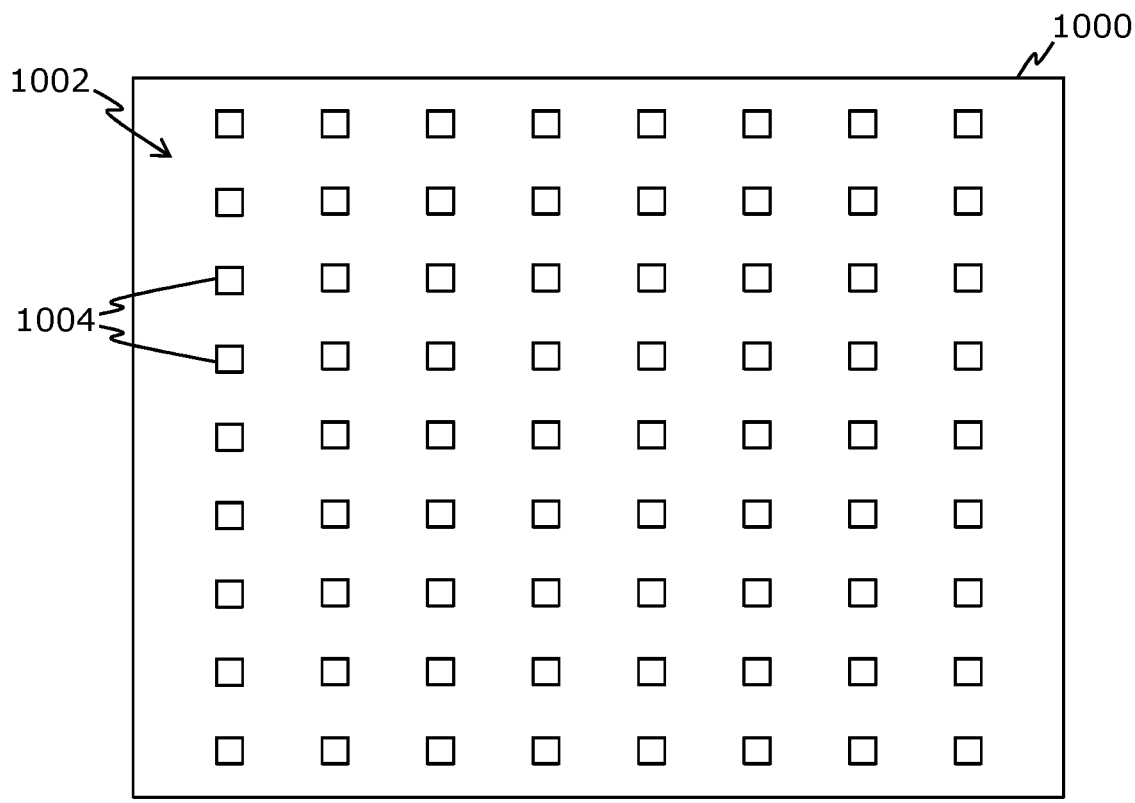
FIGS. 10A and 10B are schematic illustrations of an illuminating unit, in accordance with another embodiment of the present disclosure.
Figure 10B:
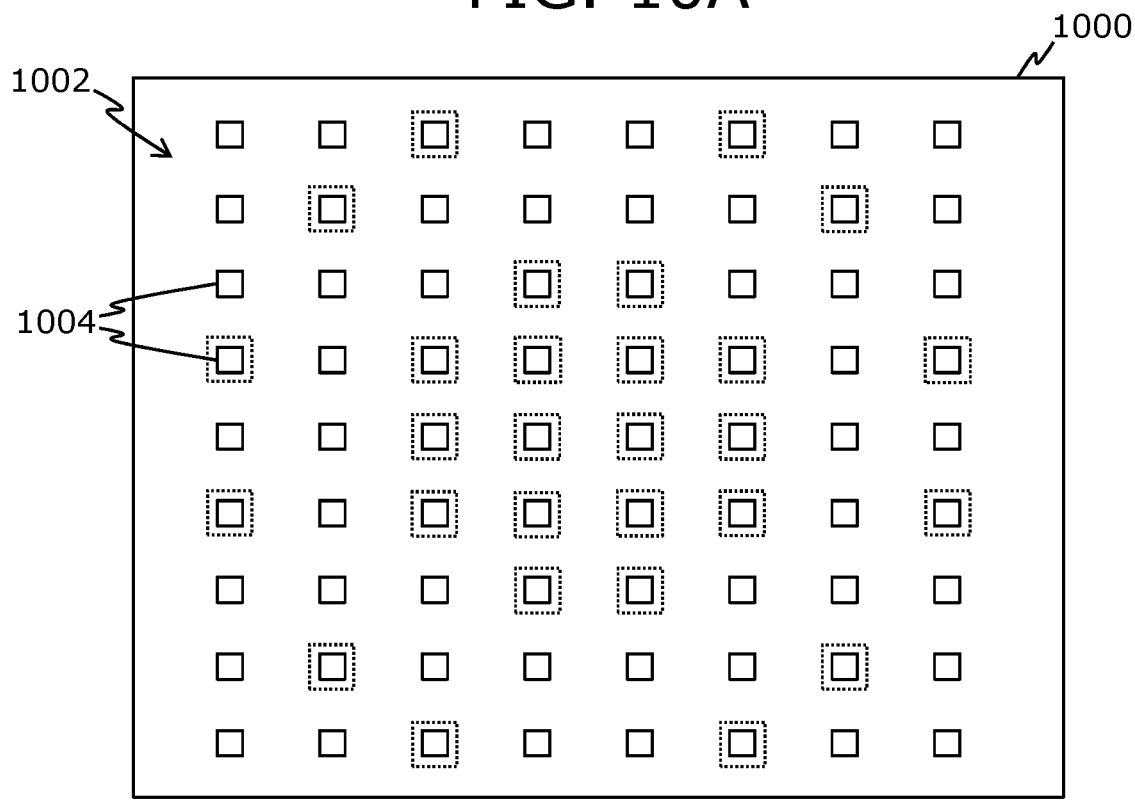

The aforementioned example has been illustrated in conjunction with FIGS. 10A and 10B, for the sake of clarity.

Optionally, in the uniform two-dimensional pattern, a horizontal spacing between a given pair of horizontally adjacent optical emitters is same as a vertical spacing between a given pair of vertically adjacent optical emitters. Alternatively, optionally, in the uniform two-dimensional pattern, a horizontal spacing between a given pair of horizontally adjacent optical emitters is same as a vertical spacing between a given pair of vertically adjacent optical emitters.

Optionally, the distance-imaging system further comprises the at least one second actuator associated with the at least one optical element, wherein the processor is configured to control the at least one second actuator to adjust a rotational orientation of the at least one optical element according to the gaze direction of the user. As described earlier, when the spatially non-uniform pattern of light spots is formed according to the gaze direction of the user, said rotation of the at least one optical element is performed to align the at least one optical element in a manner that the reflections of the first portion of the said pattern would pass through or reflect from the first optical portion, while the reflections of the second portion of said pattern would pass through or reflect from the second optical portion.

In still another embodiment, the illuminating unit comprises a plurality of optical emitters arranged in a non-uniform two-dimensional pattern. In particular, the plurality of optical emitters are arranged in a same form as the spatially non-uniform pattern of light spots that is to be projected onto the objects in the real-world environment. Optionally, in this regard, the plurality of optical emitters comprise a first group of optical emitters and a second group of optical emitters, wherein optical emitters of the first group are arranged more densely (namely, closer to each other) as compared to optical emitters of the second group. As a result, light emitted by the first group of optical emitters produces the first portion of the spatially non-uniform pattern of light spots, whereas light emitted by the second group of optical emitters produces the second portion of the spatially non-uniform pattern of light spots.

Figure 11:
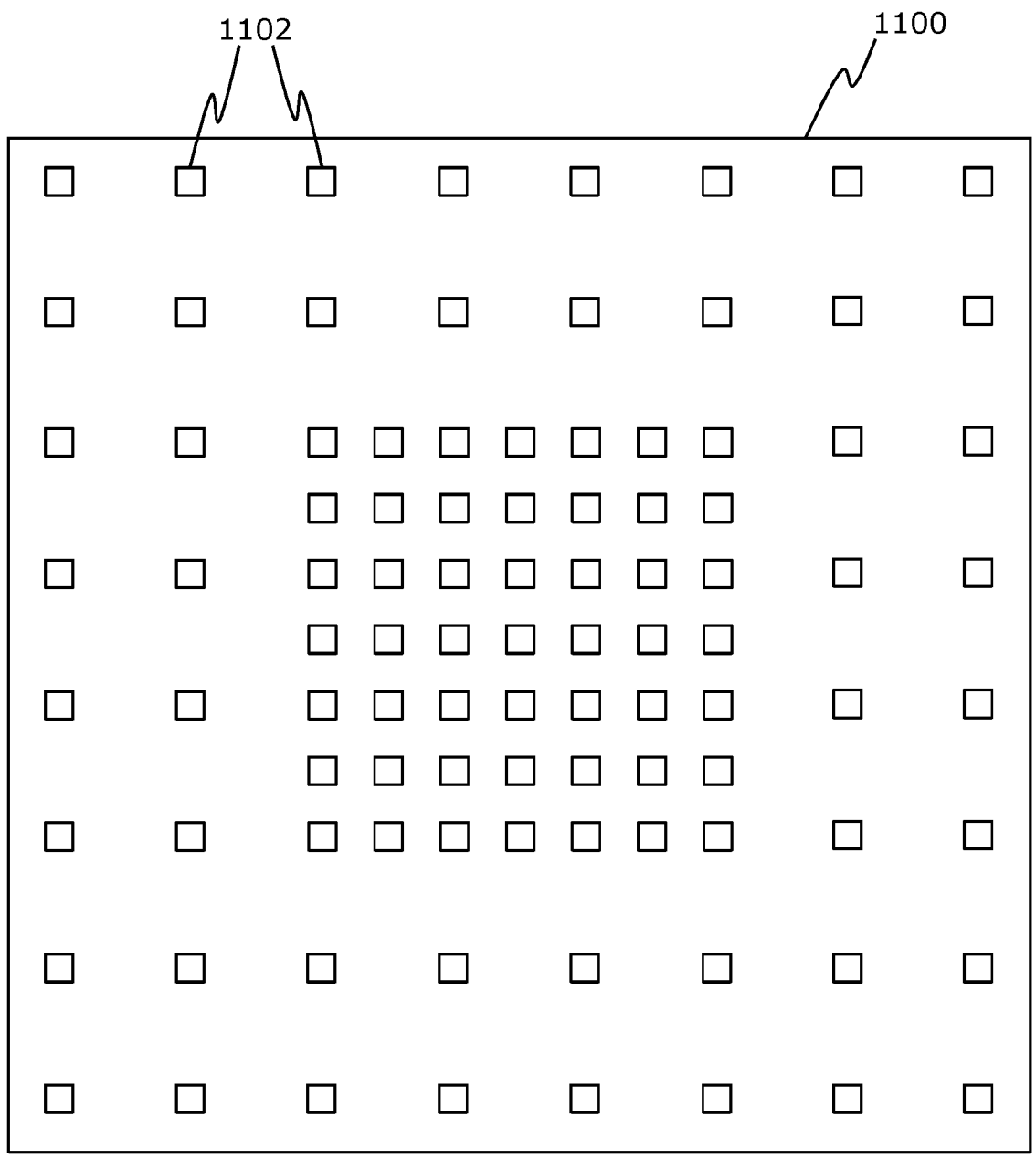
FIG. 11 is a schematic illustration of an illuminating unit, in accordance with yet another embodiment of the present disclosure.

One such illuminating unit comprising the plurality of optical emitters arranged in the non-uniform two-dimensional pattern has been illustrated in conjunction with FIG. 11, for the sake of clarity.

Optionally, the optical emitters comprise vertical-cavity surface-emitting laser (VCSEL) diodes. It will be appreciated that such VCSEL diodes are easy to test and manufacture, and are also cost effective in terms of manufacturing large quantities thereof.

Optionally, in this regard, the distance-imaging system further comprises a diffractive filter arranged on an optical path of light emitted from the VCSEL diodes, wherein the diffractive filter variably diffracts said light to produce the spatially non-uniform pattern of light spots. More optionally, a processor of the distance-imaging system is configured to control the diffractive filter to adjust at least one of: an angular width of the spatially non-uniform pattern of light spots, a number of light spots in the spatially non-uniform pattern of light spots.

The present disclosure also relates to the method as described above. Various embodiments and variants disclosed above, with respect to the aforementioned first aspect, apply mutatis mutandis to the method.

Optionally, in the method, an angular width of the first portion of the spatially non-uniform pattern with respect to the at least one camera lies in a range of 5 degrees to 60 degrees, and an angular width of the second portion of the spatially non-uniform pattern with respect to the at least one camera lies in a range of 40 degrees to 220 degrees.

According to an embodiment, the illuminating unit comprises a plurality of light sources, wherein the method further comprises projecting, via each of the plurality of light sources, a spatially uniform pattern of light spots onto the objects present in the real-world environment.

Optionally, in the method, the plurality of light sources comprise at least a first light source and a second light source, a first pattern of light spots projected by the first light source is denser than a second pattern of light spots projected by the second light source, an angular width associated with the first pattern of light spots is narrower than an angular width associated with the second pattern of light spots.

Optionally, the method further comprises:
receiving information indicative of a gaze direction of a user; and
adjusting an orientation of at least one of the plurality of light sources according to the gaze direction of the user.

Optionally, in this regard, the method further comprises adjusting a rotational orientation of the at least one optical element according to the gaze direction of the user.

According to another embodiment, the illuminating unit comprises:
at least one coherent light source that, in operation, emits light pulses; and
a diffractive optical element arranged on an optical path of the light pulses.

According to yet another embodiment, the illuminating unit comprises an array of optical emitters, wherein the optical emitters are arranged in a uniform two-dimensional pattern, and wherein the method further comprises:
receiving information indicative of a gaze direction of a user; and
dynamically addressing the array of optical emitters according to the gaze direction of the user.

Optionally, in this regard, the method further comprises adjusting a rotational orientation of the at least one optical element according to the gaze direction of the user.

According to still another embodiment, the illuminating unit comprises a plurality of optical emitters arranged in a non-uniform two-dimensional pattern.

Optionally, in the method, the optical emitters comprise vertical-cavity surface-emitting laser diodes.

DETAILED DESCRIPTION OF THE DRAWINGS

Referring to FIG. 1, illustrated is a block diagram of architecture of a distance-imaging system 100, in accordance with an embodiment of the present disclosure. The distance-imaging system 100 comprises an illuminating unit 102, at least one camera (depicted as a camera 104) and at least one optical element (depicted as an optical element 106) associated with the camera 104. The illuminating unit 102, in operation, projects a spatially non-uniform pattern of light spots onto objects present in a real-world environment, wherein a first portion of said spatially non-uniform pattern has a higher density of light spots than a second portion of said spatially non-uniform pattern. The camera 104, in operation, captures an image of reflections of the light spots from surfaces of the objects. A first optical portion of the optical element 106 has a higher magnification factor than a second optical portion of the optical element 106, wherein reflections of said spatially non-uniform first and second portions of the spatially non-uniform pattern of light spots are differently magnified and/or de-magnified by said first and second optical portions of the optical element 106, respectively.

Figure 2:
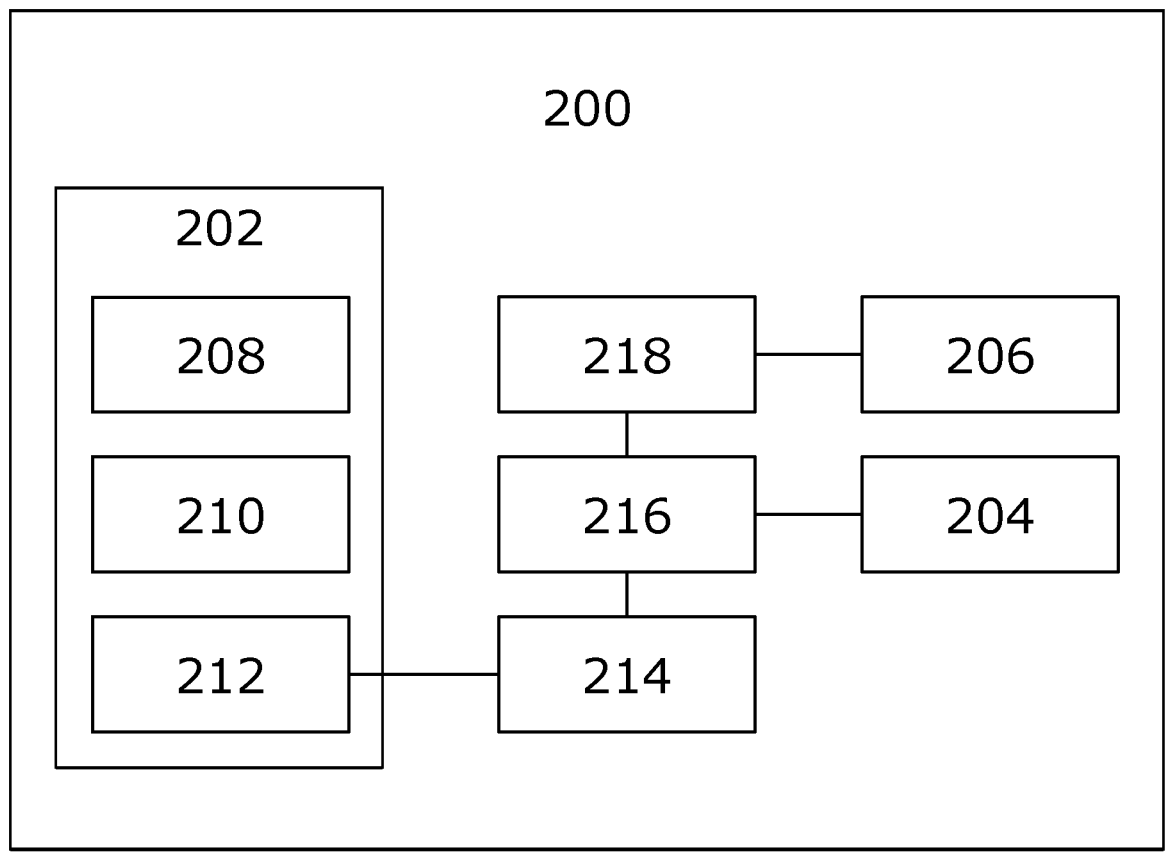

Referring to FIG. 2, illustrated is a block diagram of architecture of a distance-imaging system 200, in accordance with another embodiment of the present disclosure. The distance-imaging system 200 comprises an illuminating unit 202, at least one camera (depicted as a camera 204) and at least one optical element (depicted as an optical element 206) associated with the camera 204. The illuminating unit 202 comprises a plurality of light sources (depicted as light sources 208, 210 and 212). Each of the light sources 208, 210 and 212, in operation, projects a spatially uniform pattern of light spots onto the objects present in the real-world environment. The distance-imaging system 200 further comprises at least one first actuator (depicted as a first actuator 214) associated with the light source 212, a processor 216 and at least one second actuator (depicted as a second actuator 218) associated with the optical element 206. The processor 216 is configured to receive information indicative of a gaze direction of a user, and to control the first actuator 214 to adjust an orientation of the light source 212 according to the gaze direction of the user. Moreover, the processor 216 is configured to control the second actuator 218 to adjust a rotational orientation of the optical element 206 according to the gaze direction of the user.

Figure 3:
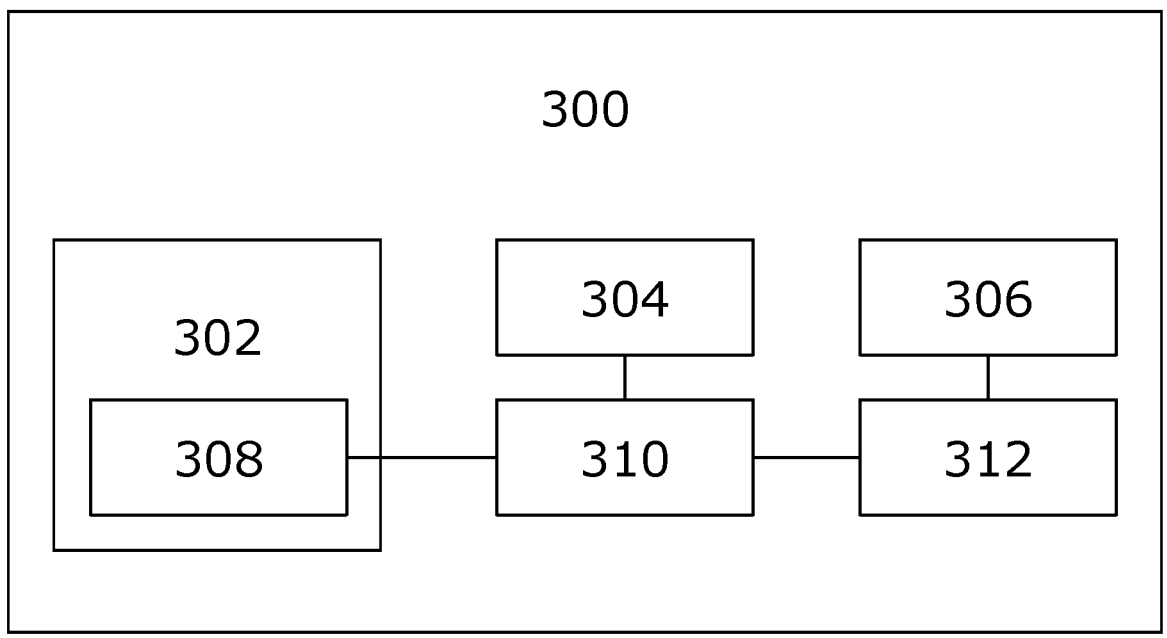

Referring to FIG. 3, illustrated is a block diagram of architecture of a distance-imaging system 300, in accordance with yet another embodiment of the present disclosure. The distance-imaging system 300 comprises an illuminating unit 302, at least one camera (depicted as a camera 304) and at least one optical element (depicted as an optical element 306) associated with the camera 304. The illuminating unit 302 comprises an array 308 of optical emitters, wherein the optical emitters are arranged in a uniform two-dimensional pattern. The distance-imaging system 300 further comprises a processor 310 and at least one second actuator (depicted as a second actuator 312) associated with the optical element 306. The processor 310 is configured to receive information indicative of a gaze direction of a user, and to dynamically address the array 308 of optical emitters according to the gaze direction of the user. Moreover, the processor 310 is configured to control the second actuator 312 to adjust a rotational orientation of the optical element 306 according to the gaze direction of the user.

It may be understood by a person skilled in the art that the FIGS. 1, 2 and 3 include simplified architectures of different distance-imaging systems 100, 200 and 300 for sake of clarity, which should not unduly limit the scope of the claims herein. The person skilled in the art will recognize many variations, alternatives, and modifications of embodiments of the present disclosure.

Figure 4A:
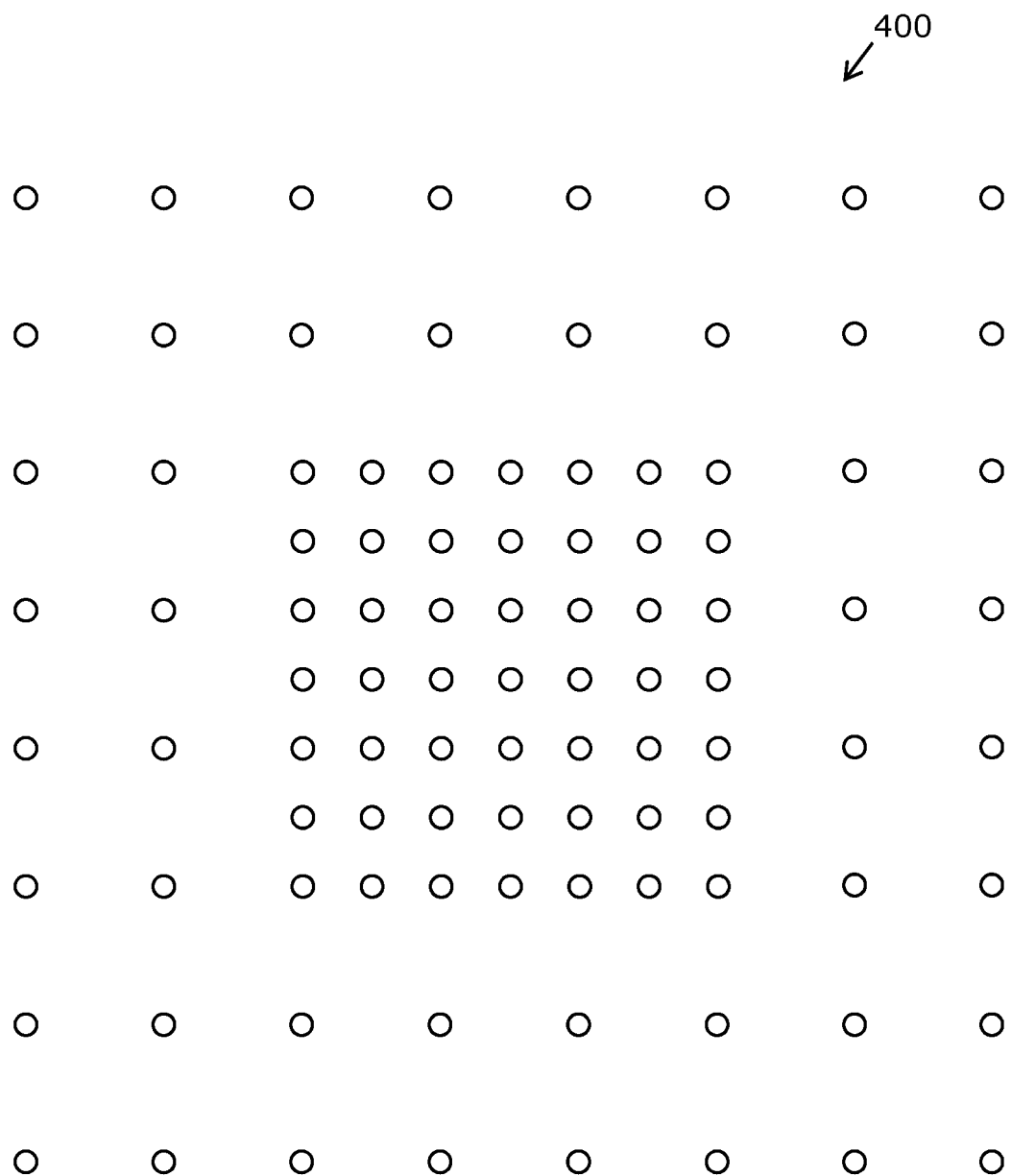
FIGS. 4A and 4B illustrate schematic illustrations of a spatially non-uniform pattern of light spots that is projected by an illuminating unit onto objects present in a real-world environment, in accordance with different embodiments of the present disclosure.
Figure 4B:
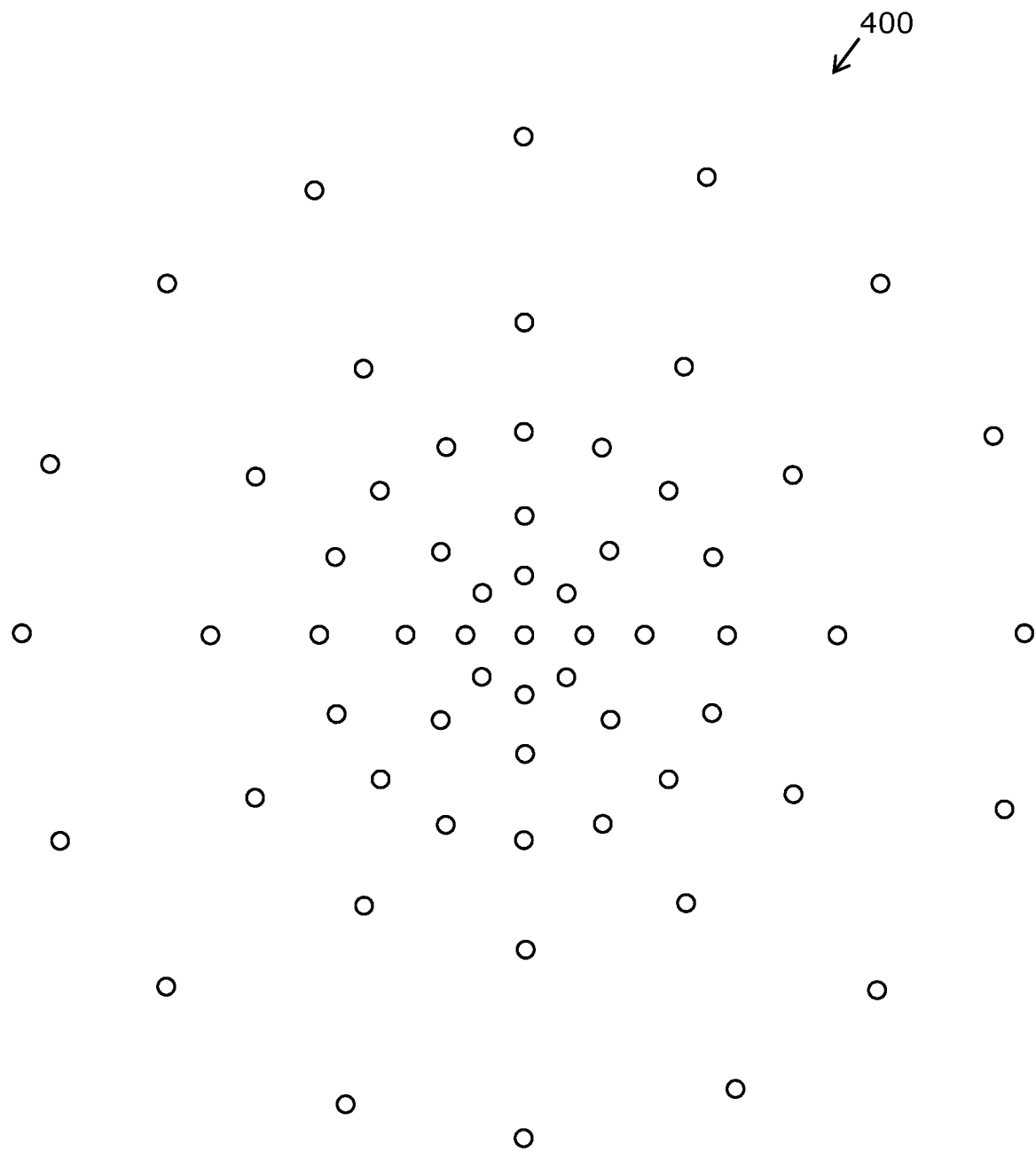

Referring to FIGS. 4A and 4B, illustrated are schematic illustrations of a spatially non-uniform pattern 400 of light spots that is projected by an illuminating unit onto objects present in a real-world environment, in accordance with different embodiments of the present disclosure. It may be understood by a person skilled in the art that the FIGS. 4A and 4B include simplified illustrations of the spatially non-uniform pattern 400 of light spots for sake of clarity, which should not unduly limit the scope of the claims herein. The person skilled in the art will recognize many variations, alternatives, and modifications of embodiments of the present disclosure. For example, in FIGS. 4A and 4B, the light spots are depicted to have a circular shape. Such light spots could have other shapes such as an elliptical shape, a polygonal shape or a freeform shape.

As shown in FIGS. 4A and 4B, a density of light spots in the spatially non-uniform pattern 400 of light spots varies along both horizontal and vertical directions. A first portion (depicted as a central portion) of said spatially non-uniform pattern 400 has a higher density of light spots than a second portion (depicted as a peripheral portion) of the said spatially non-uniform pattern 400.

In FIG. 4A, a shape of the first portion of the spatially non-uniform pattern 400 of light spots is rectangular.

In FIG. 4B, a shape of the first portion of the spatially non-uniform pattern 400 of light spots is circular.

Figure 5A:
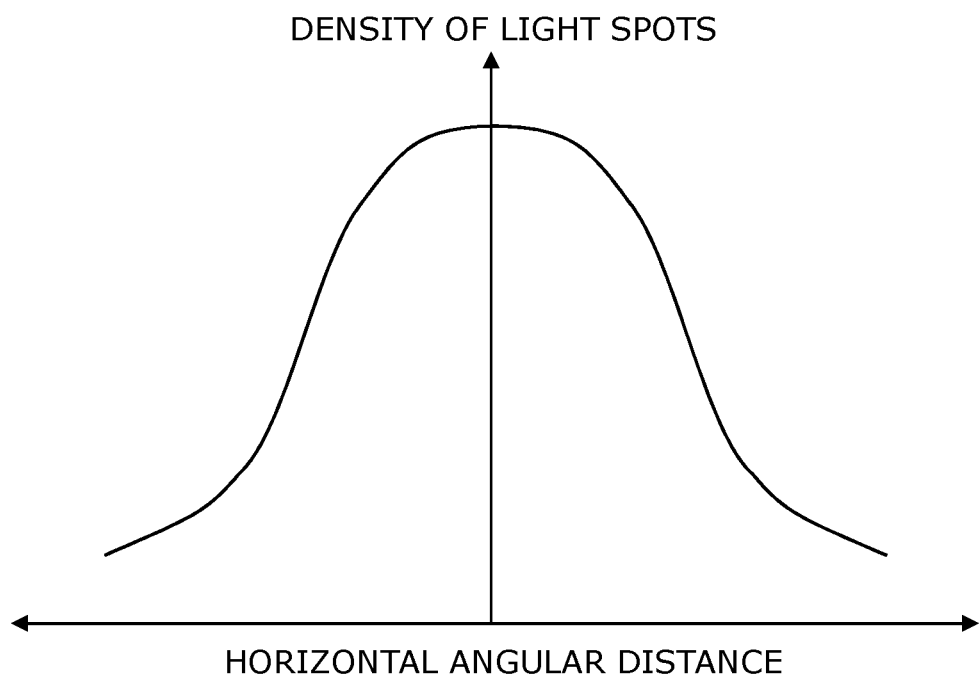
FIGS. 5A and 5B illustrate example graphical representations of a spatial variance of the spatially non-uniform pattern of light spots depicted in FIG. 4B, in accordance with an embodiment of the present disclosure.
Figure 5B:
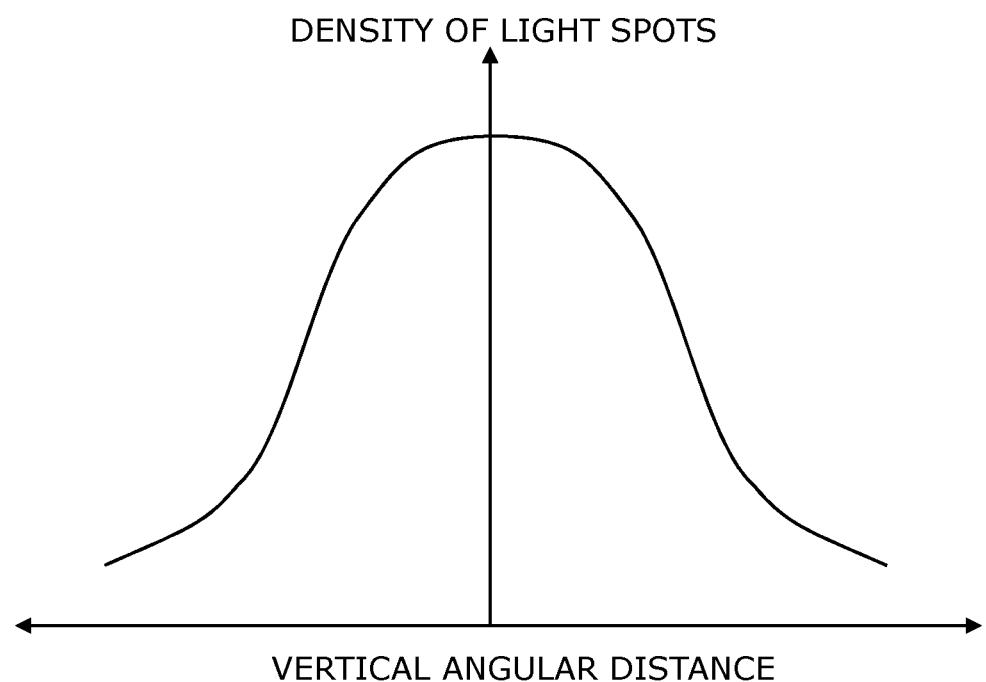

Referring to FIGS. 5A and 5B, illustrated are example graphical representations of a spatial variance of the spatially non-uniform pattern 400 of light spots depicted in FIG. 4B, in accordance with an embodiment of the present disclosure.

In FIG. 5A, the density of light spots is shown to vary along a horizontal direction according to a Gaussian function. In such a case, the density of light spots in a given portion of the spatially non-uniform pattern 400 varies non-linearly as a function of a horizontal angular distance between the given portion and a centre of the first portion of said pattern 400. Notably, the density of light spots is maximum near a central portion of said pattern 400 and decreases non-linearly on going from the centre of said pattern 400 towards an edge of said pattern 400.

In FIG. 5B, the density of light spots is shown to vary along a vertical direction according to a Gaussian function. In such a case, the density of light spots in a given portion of the spatially non-uniform pattern 400 varies non-linearly as a function of a vertical angular distance between the given portion and the centre of the first portion of said pattern 400. Notably, the density of light spots is maximum near a central portion of said pattern 400 and decreases non-linearly on going from the centre of said pattern 400 towards an edge of said pattern 400.

Figure 6A:
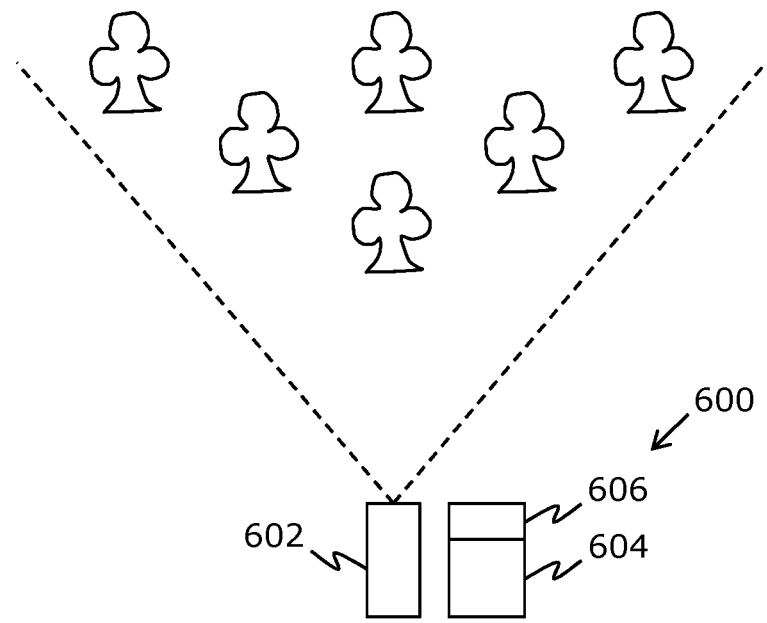
FIGS. 6A and 6B illustrate schematic illustrations of a distance-imaging system in use within a real-world environment, in accordance with different embodiments of the present disclosure.
Figure 6B:
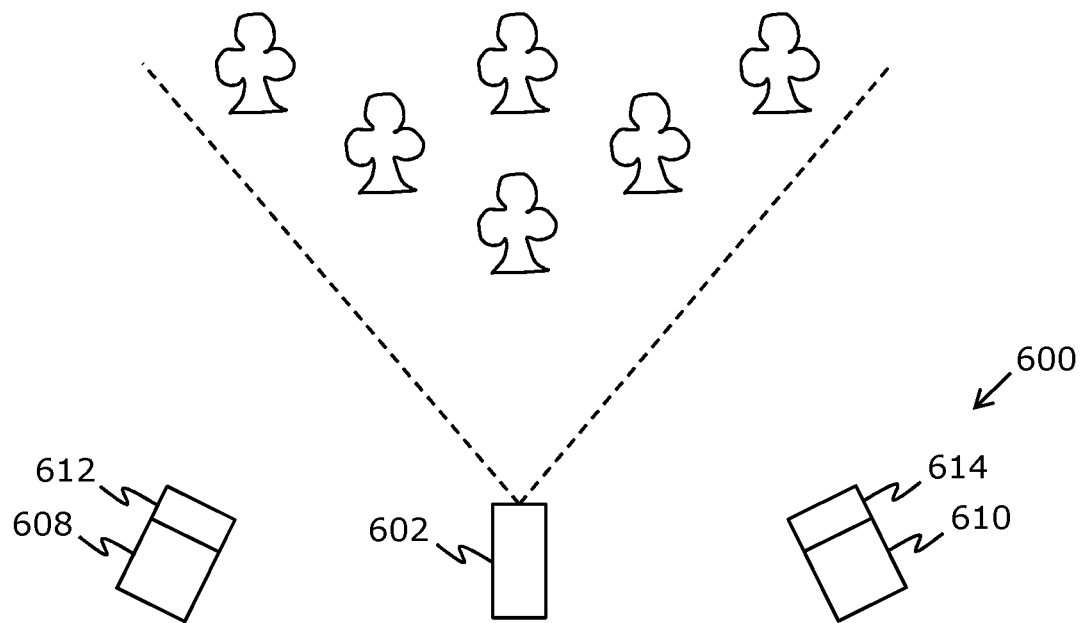

Referring to FIGS. 6A and 6B, illustrated are schematic illustrations of a distance-imaging system 600 in use within a real-world environment, in accordance with different embodiments of the present disclosure. It may be understood by a person skilled in the art that the FIGS. 6A and 6B include simplified illustrations of the distance-imaging system 600 in use within the real-world environment for sake of clarity, which should not unduly limit the scope of the claims herein. The person skilled in the art will recognize many variations, alternatives, and modifications of embodiments of the present disclosure. For example, components of the distance-imaging system 600 may be arranged differently within the real-world environment.

As shown in FIG. 6A, the distance-imaging system 600 comprises an illuminating unit 602, a camera 604 and an optical element 606 associated with the camera 604. The illuminating unit 602, in operation, projects a spatially non-uniform pattern of light spots onto objects present in the real-world environment, wherein a first portion of said spatially non-uniform pattern has a higher density of light spots than a second portion of said pattern. The camera 604, in operation, captures an image of reflections of the light spots from surfaces of the objects in the real-world environment. The captured image is compared with a reference image of the spatially non-uniform pattern of light spots, to calculate the distance between points in the captured image and the distance-imaging system 600.

As shown in FIG. 6B, the distance-imaging system 600 comprises the illuminating unit 602, cameras 608 and 610 and optical elements 612 and 614 associated with the cameras 608 and 610, respectively. The cameras 608 and 610, in operation, capture different images of reflections of the light spots from surfaces of the objects in the real-world environment. Such different images are to be compared with each other to calculate distances between the objects in the real-world environment and the distance-imaging system 600 via triangulation technique.

Referring to FIG. 7A, illustrated is an exemplary implementation of an illuminating unit 700 in a real-world environment, while FIG. 7B is an illustration of a spatially non-uniform pattern of light spots as projected on an imaginary plane 702 in the real-world environment, in accordance with an embodiment of the present disclosure.

In FIG. 7A, the illuminating unit 700 is shown to comprise a plurality of light sources (depicted as a light source 704 and a light source 706). Each of the light sources 704 and 706, in operation, project a spatially uniform pattern of light spots onto the imaginary plane 702 in the real-world environment. As shown, the light sources 704 and 706 project a same spatially uniform pattern of light spots onto the imaginary plane 702. A projection of said pattern from the light source 704 is depicted by dashed arrows, whereas a projection of said pattern from the light source 706 is depicted by dotted arrows, for sake of clarity only.

In FIG. 7B, at the imaginary plane 702, the aforesaid two spatially uniform patterns overlap along a horizontal direction to produce a resultant spatially non-uniform pattern of light spots. Notably, dot-shaped light spots denote the spatially uniform pattern projected by the light source 704, whereas four-point star-shaped light spots denote the spatially uniform pattern projected by the light source 706. As shown, these two spatially uniform patterns overlap in a central portion of the imaginary plane 702, thereby producing, at such central portion, a higher density of light spots as compared to a peripheral portion of the imaginary plane 702. Therefore, overlapping light spots of the two spatially uniform patterns correspond to the first portion of said spatially non-uniform pattern, whereas non-overlapping light spots of the two spatially uniform patterns correspond to the second portion of said spatially non-uniform pattern. An angular width 'w1' of the first portion of the spatially non-uniform pattern lies in a range of 5 degrees to 60 degrees, and an angular width 'w2' of the second portion of the spatially non-uniform pattern lies in a range of 40 degrees to 220 degrees.

It may be understood by a person skilled in the art that the FIGS. 7A and 7B are merely examples for sake of clarity, which should not unduly limit the scope of the claims herein. The person skilled in the art will recognize many variations, alternatives, and modifications of embodiments of the present disclosure. For example, the two spatially uniform patterns of light spots could overlap along a vertical direction to produce a resultant spatially non-uniform pattern of light spots.

Referring to FIG. 8A, illustrated is an exemplary implementation of an illuminating unit 800 in a real-world environment, while FIG. 8B is an illustration of a spatially non-uniform pattern of light spots as projected on an imaginary plane 802 in the real-world environment, in accordance with another embodiment of the present disclosure.

In FIG. 8A, the illuminating unit 800 is shown to comprise a first light source 804 and a second light source 806. A first pattern of light spots projected by the first light source 804 is denser than a second pattern of light spots projected by the second light source 806, an angular width associated with the first pattern of light spots is narrower than an angular width associated with the second pattern of light spots. A projection of the first pattern of light spots is depicted by dotted arrows, whereas a projection of the second pattern of light spots is depicted by dashed arrows, for sake of clarity only.

In FIG. 8B, at the imaginary plane 802, the aforesaid first and second patterns overlap to produce a resultant spatially non-uniform pattern of light spots. Notably, cross-shaped light spots denote the first pattern projected by the first light source 804, whereas dot-shaped light spots denote the second pattern projected by the second light source 806. As shown, the first and second patterns overlap in a central portion of the imaginary plane 802, thereby producing, at such a central portion, a higher density of light spots as compared to a peripheral portion of the imaginary plane 802. Therefore, such overlapping light spots correspond to the first portion of said spatially non-uniform pattern, whereas non-overlapping light spots correspond to the second portion of said spatially non-uniform pattern. An angular width 'x1' of the first portion of the spatially non-uniform pattern lies in a range of 5 degrees to 60 degrees, and an angular width 'x2' of the second portion of the spatially non-uniform pattern lies in a range of 40 degrees to 220 degrees.

It may be understood by a person skilled in the art that the FIGS. 8A and 8B are merely examples for sake of clarity, which should not unduly limit the scope of the claims herein. The person skilled in the art will recognize many variations, alternatives, and modifications of embodiments of the present disclosure. For example, the two spatially uniform patterns of light spots could overlap in a top-right portion of the imaginary plane 802 to produce the resultant spatially non-uniform pattern of light spots.

Referring to FIG. 9, illustrated is a schematic illustration of an illuminating unit 900, in accordance with an embodiment of the present disclosure. The illuminating unit 900 comprises at least one coherent light source (depicted as a coherent light source 902) that, in operation, emits light pulses 'A' and a diffractive optical element 904 arranged on an optical path of the light pulses 'A'. The diffractive optical element 904 causes diffraction of the light pulses 'A' at various angles to produce a diffraction pattern, a central portion of said diffraction pattern having a higher density of light pulses as compared to a peripheral portion of said diffraction pattern. Therefore, said diffraction pattern acts as a spatially non-uniform pattern of light spots wherein a first portion of the spatially non-uniform pattern corresponds to the central portion of the diffraction pattern and a second portion of the spatially non-uniform pattern corresponds to the peripheral portion of the diffraction pattern.

Referring to FIGS. 10A and 10B, illustrated are schematic illustrations of an illuminating unit 1000, in accordance with another embodiment of the present disclosure. The illuminating unit 1000 comprises an array 1002 of optical emitters 1004, wherein the optical emitters 1004 are arranged in a uniform two-dimensional pattern. In such a case, information indicative of a gaze direction of a user is used to dynamically address the array 1002 of optical emitters 1004 according to the gaze direction of the user.

When the gaze direction of the user lies, for example, in a central portion of a real-world environment, the array 1002 is dynamically addressed as shown in FIG. 10B. In particular, a set of optical emitters having a same relative position in the array 1002 as the central portion of the real-world environment are switched on to form a first portion of the spatially non-uniform pattern of light spots, and remaining optical emitters of the array 1002 are selectively switched on or switched off to form a second portion of the spatially non-uniform pattern of light spots. Notably, optical emitters depicted with a dashed outline around them are switched on, whereas optical emitters depicted without such a dashed outline are switched off. Upon being dynamically addressed in such a manner, light emitted by all optical emitters of the array 1002 that are switched on forms a gaze-contingent spatially non-uniform pattern of light spots.

Referring to FIG. 11, illustrated is a schematic illustration of an illuminating unit 1100, in accordance with yet another embodiment of the present disclosure. The illuminating unit 1100 comprises a plurality of optical emitters (depicted as optical emitters 1102) arranged in a non-uniform two-dimensional pattern. In particular, the plurality of optical emitters 1102 are arranged in a same form as a spatially non-uniform pattern of light spots that is to be projected onto objects in a real-world environment. The plurality of optical emitters 1102 comprise a first group of optical emitters and a second group of optical emitters, wherein optical emitters of the first group are arranged more densely (namely, closer to each other) as compared to optical emitters of the second group. As a result, light emitted by the first group of optical emitters produces the first portion of the spatially non-uniform pattern of light spots, whereas light emitted by the second group of optical emitters produces the second portion of the spatially non-uniform pattern of light spots.

FIGS. 9, 10A and 10B, and 11 are merely simplified example illustrations of illuminating units 900, 1000, and 1100, for sake of clarity only, and should not unduly limit the scope of the claims herein. A person skilled in the art will recognize many variations, alternatives, and modifications of embodiments of the present disclosure.

Figure 12:
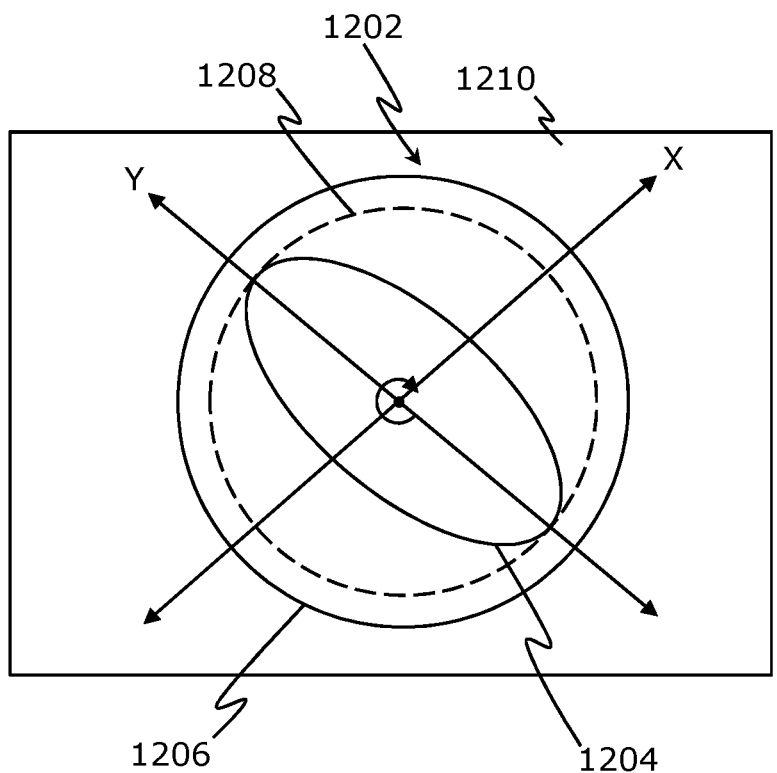
FIG. 12 is a schematic illustration of an example implementation where a symmetrical optical element is rotated with respect to a camera, in accordance with an embodiment of the present disclosure.

Referring to FIG. 12, illustrated is a schematic illustration of an example implementation where a symmetrical optical element 1202 is rotated with respect to a camera, in accordance with an embodiment of the present disclosure. In this example implementation, the optical element 1202 is symmetrical about its optical axis and a first optical portion 1204 is substantially ellipsoidal in shape. The first optical portion 1204 of the optical element 1202 has a higher magnification factor than a second optical portion 1206 of the optical element 1202.

In FIG. 12, there is shown an optical centre (depicted by a black dot) of the first optical portion 1204, which is also a centre of rotation. Two lines representing X and Y directions pass through the centre of rotation, which overlaps with the centre of the image. The optical element 1202 is rotated (namely, about the centre of rotation) to cover a circular area 1208 on a camera chip 1210 of the camera using the first optical portion 1204.

The optical element 1202 is rotated to a given position, and the rotation is stopped when the first optical portion 1204 is aligned according to the detected gaze direction. In this way, the optical element 1202 is rotated repeatedly, based upon the detected gaze direction.

When moving from a first position to a second position (namely, with respect to a change in the user's gaze direction), the optical element 1202 is required to be rotated at an angle that lies in:
  a range of 0 degrees to 180 degrees, when the optical element 1202 rotates in only one direction, or
  a range of 0 degrees to 90 degrees, when the optical element 1202 rotates in both directions.

Figure 13:
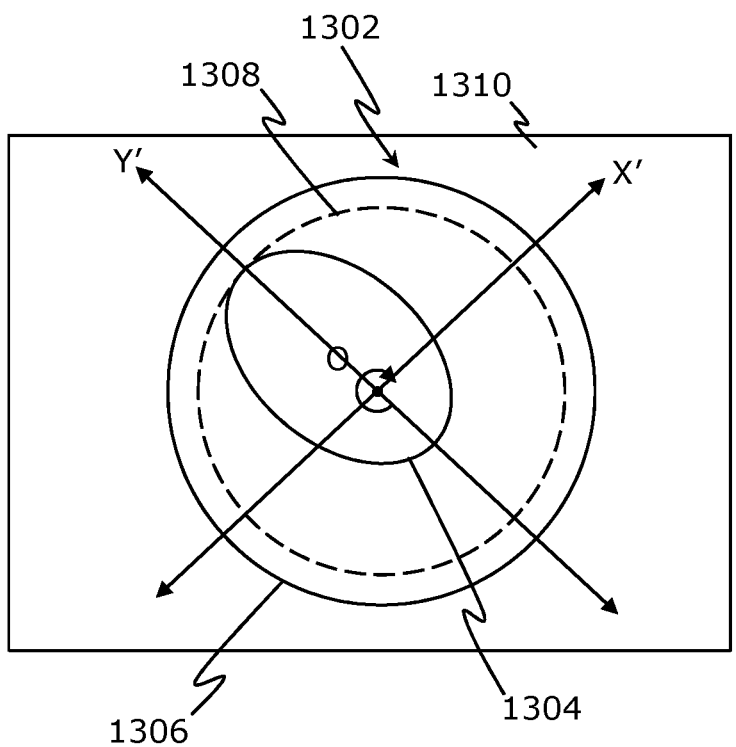
FIG. 13 is a schematic illustration of another example implementation where an asymmetrical optical element is rotated with respect to a camera, in accordance with another embodiment of the present disclosure.

Referring to FIG. 13, illustrated is a schematic illustration of another example implementation where an asymmetrical optical element 1302 is rotated with respect to a camera, in accordance with another embodiment of the present disclosure. In this example implementation, the optical element 1302 is asymmetrical about its optical axis and a first optical portion 1304 is substantially ellipsoidal in shape. The first optical portion 1304 of the optical element 1302 has a higher magnification factor than a second optical portion 1306 of the optical element 1302.

In FIG. 13, there are shown an optical centre 'O' of the first optical portion 1304 and a centre of rotation (depicted by a black dot). Two lines representing X' and Y' directions pass through the centre of rotation, which overlaps with the centre of the image. As the optical centre 'O' of the first optical portion 1304 is not the same as the centre of rotation, the optical element 1302 is rotated (namely, about the centre of rotation) to cover a circular area 1308 on a camera chip 1310 of the camera using the first optical portion 1304.

The optical element 1302 is rotated to a given position, and the rotation is stopped when the first optical portion 1304 is aligned according to the detected gaze direction. In this way, the optical element 1302 is rotated repeatedly, based upon the detected gaze direction.

When moving from a first position to a second position (namely, with respect to a change in the user's gaze direction), the optical element 1302 is required to be rotated at an angle that lies in:
 a range of 0 degrees to 360 degrees, when the optical element 1302 rotates in only one direction, or
 a range of 0 degrees to 180 degrees, when the optical element 1302 rotates in both directions.

FIGS. 12 and 13 are merely examples, which should not unduly limit the scope of the claims herein. A person skilled in the art will recognize many variations, alternatives, and modifications of embodiments of the present disclosure. It will be appreciated that the optical elements 1202 and 1302 have been depicted as lenses, for the sake of convenience only; the optical elements 1202 and 1302 are not limited to a particular type of optical element. In other words, the optical elements 1202 and 1302 can be implemented as a single lens or mirror having a complex shape or as a configuration of lenses and/or mirrors.

Figure 14:
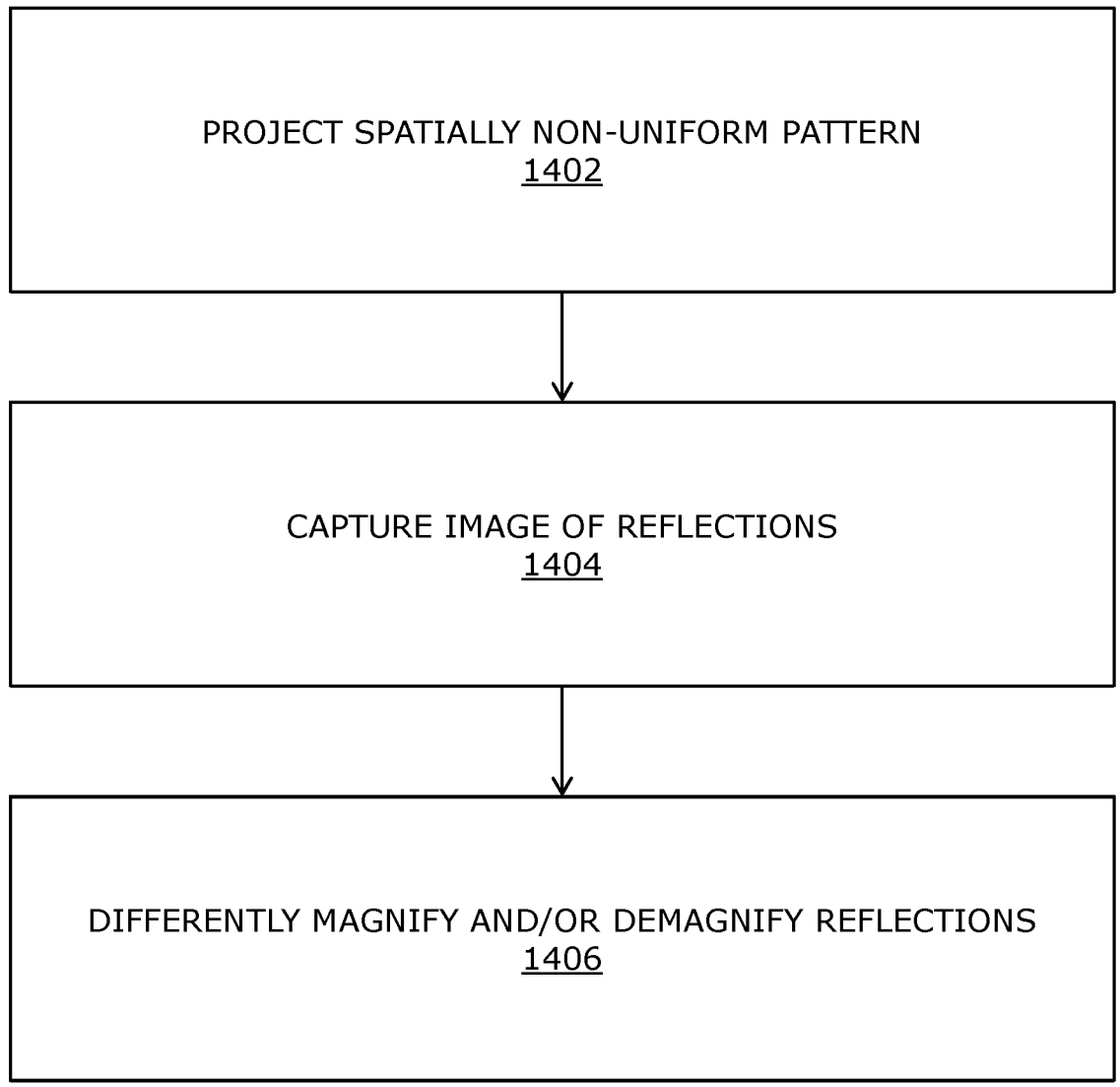
FIG. 14 illustrates steps of a method of distance imaging, via a distance-imaging system, in accordance with an embodiment of the present disclosure.

Referring to FIG. 14, illustrated are steps of a method of distance imaging, via a distance-imaging system, in accordance with an embodiment of the present disclosure. In the method, the distance-imaging system comprises an illuminating unit, at least one camera and at least one optical element. At a step 1402, a spatially non-uniform pattern of light spots is projected, via the illuminating unit, onto objects present in a real-world environment. A first portion of said pattern has a higher density of light spots than a second portion of said pattern. At a step 1404, an image of reflections of the light spots from surfaces of the objects is captured, via the at least one camera. At a step 1406, reflections of said first and second portions of the spatially non-uniform pattern of light spots are differently magnified and/or de-magnified using first and second optical portions of the at least one optical element, respectively. The first optical portion of the at least one optical element has a higher magnification factor than the second optical portion of the at least one optical element.

The steps 1402 to 1406 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A distance-imaging system comprising:
 an illuminating unit that, in operation, projects a spatially non-uniform pattern of light spots onto objects present in a real-world environment, wherein a first portion of said pattern has a higher density of light spots than a second portion of said pattern;
 at least one camera that, in operation, captures an image of reflections of the light spots from surfaces of the objects; and
 at least one optical element associated with the at least one camera, wherein a first optical portion of the at least one optical element has a higher magnification factor than a second optical portion of the at least one optical element, wherein reflections of said first and second portions of the spatially non-uniform pattern of light spots are differently magnified and/or de-magnified in horizontal and vertical directions by said first and second optical portions of the at least one optical element, respectively.

2. The distance-imaging system of claim 1, an angular width of the first portion of the spatially non-uniform pattern with respect to the at least one camera lies in a range of 5 degrees to 60 degrees, and an angular width of the second portion of the spatially non-uniform pattern with respect to the at least one camera lies in a range of 40 degrees to 220 degrees.

3. The distance-imaging system of claim 1, wherein the illuminating unit comprises a plurality of light sources, each of the plurality of light sources, in operation, projecting a spatially uniform pattern of light spots onto the objects present in the real-world environment.

4. The distance-imaging system of claim 3, wherein the plurality of light sources comprise at least a first light source and a second light source, a first pattern of light spots projected by the first light source is denser than a second pattern of light spots projected by the second light source, an angular width associated with the first pattern of light spots is narrower than an angular width associated with the second pattern of light spots.

5. The distance-imaging system of claim 3, further comprising:
 at least one first actuator associated with at least one of the plurality of light sources; and
 a processor configured to receive information indicative of a gaze direction of a user, and to control the at least one first actuator to adjust an orientation of the at least one of the plurality of light sources according to the gaze direction of the user.

6. The distance-imaging system of claim 5, further comprising at least one second actuator associated with the at least one optical element, wherein the processor is configured to control the at least one second actuator to adjust a rotational orientation of the at least one optical element according to the gaze direction of the user.

7. The distance-imaging system of claim 1, wherein the illuminating unit comprises:
 at least one coherent light source that, in operation, emits light pulses; and
 a diffractive optical element arranged on an optical path of the light pulses.

8. The distance-imaging system of claim 1, wherein the illuminating unit comprises an array of optical emitters, wherein the optical emitters are arranged in a uniform two-dimensional pattern, and wherein the distance-imaging system further comprises a processor configured to receive information indicative of a gaze direction of a user, and to dynamically address the array of optical emitters according to the gaze direction of the user.

9. The distance-imaging system of claim 8, further comprising at least one second actuator associated with the at least one optical element, wherein the processor is configured to control the at least one second actuator to adjust a rotational orientation of the at least one optical element according to the gaze direction of the user.

10. The distance-imaging system of claim 1, wherein the illuminating unit comprises a plurality of optical emitters arranged in a non-uniform two-dimensional pattern.

11. The distance-imaging system of claim 8, wherein the optical emitters comprise vertical-cavity surface-emitting laser diodes.

12. A method of distance imaging, via a distance-imaging system comprising an illuminating unit, at least one camera and at least one optical element, the method comprising:
   projecting, via the illuminating unit, a spatially non-uniform pattern of light spots onto objects present in a real-world environment, wherein a first portion of said pattern has a higher density of light spots than a second portion of said pattern;
   capturing, via the at least one camera, an image of reflections of the light spots from surfaces of the objects; and
   differently magnifying and/or de-magnifying reflections of said first and second portions of the spatially non-uniform pattern of light spots in horizontal and vertical directions using first and second optical portions of the at least one optical element, respectively, wherein the first optical portion of the at least one optical element has a higher magnification factor than the second optical portion of the at least one optical element.

13. The method of claim 12, wherein an angular width of the first portion of the spatially non-uniform pattern with respect to the at least one camera lies in a range of 5 degrees to 60 degrees, and an angular width of the second portion of the spatially non-uniform pattern with respect to the at least one camera lies in a range of 40 degrees to 220 degrees.

14. The method of claim 12, wherein the illuminating unit comprises a plurality of light sources, wherein the method further comprises projecting, via each of the plurality of light sources, a spatially uniform pattern of light spots onto the objects present in the real-world environment.

15. The method of claim 14, wherein the plurality of light sources comprise at least a first light source and a second light source, a first pattern of light spots projected by the first light source is denser than a second pattern of light spots projected by the second light source, an angular width associated with the first pattern of light spots is narrower than an angular width associated with the second pattern of light spots.

16. The method of claim 14, further comprising:
   receiving information indicative of a gaze direction of a user; and
   adjusting an orientation of at least one of the plurality of light sources according to the gaze direction of the user.

17. The method of claim 16, further comprising adjusting a rotational orientation of the at least one optical element according to the gaze direction of the user.

18. The method of claim 12, wherein the illuminating unit comprises:
   at least one coherent light source that, in operation, emits light pulses; and
   a diffractive optical element arranged on an optical path of the light pulses.

19. The method of claim 12, wherein the illuminating unit comprises an array of optical emitters, wherein the optical emitters are arranged in a uniform two-dimensional pattern, and wherein the method further comprises:
   receiving information indicative of a gaze direction of a user; and
   dynamically addressing the array of optical emitters according to the gaze direction of the user.

20. The method of claim 19, further comprising adjusting a rotational orientation of the at least one optical element according to the gaze direction of the user.

* * * * *